United States Patent

[11] 3,632,065

| [72] | Inventor | William N. Rosta<br>Fort Worth, Tex. |
|---|---|---|
| [21] | Appl. No. | 877,953 |
| [22] | Filed | Nov. 19, 1969 |
| [45] | Patented | Jan. 4, 1972 |
| [73] | Assignee | The VLM Corporation<br>Fort Worth, Tex.<br>Continuation-in-part of application Ser. No. 646,598, June 16, 1967, now Patent No. 3,507,461, Continuation-in-part of application Ser. No. 564,801, July 13, 1966, now abandoned. This application Nov. 19, 1969, Ser. No. 877,953 |

[54] ROTARY WING AIRCRAFT
27 Claims, 31 Drawing Figs.

[52] U.S. Cl. .................................................. 244/17.11,
244/12 C, 244/23 C
[51] Int. Cl. ........................................................ B64c 29/00
[50] Field of Search .......................................... 244/23 C,
12 C, 7, 15, 6, 17.11, 17.23, 17.19, 17.21

[56]       References Cited
UNITED STATES PATENTS

| 3,182,929 | 5/1965 | Lemberger .................. | 244/23 C X |
| 3,437,290 | 4/1969 | Norman ....................... | 244/23 C |
| 3,465,989 | 9/1969 | Bowshier ..................... | 244/23 C |
| 3,507,461 | 4/1970 | Rosta .......................... | 244/23 C X |
| 3,519,224 | 7/1970 | Boyd et al. .................. | 244/23 C |
| 3,532,303 | 10/1970 | Farkas ......................... | 244/23 C |

*Primary Examiner*—Milton Buchler
*Assistant Examiner*—Paul E. Sauberer
*Attorneys*—Giles C. Clegg, Jr. and Peter J. Murphy

ABSTRACT: This application discloses an improved rotary wing aircraft capable of vertical lift. The aircraft employs airfoils or rotor blades which rotate in tracks surrounding the fuselage with the airfoils being driven by low-pressure air directed through nozzles onto turbine blades in the outer track. Directional control is provided by tilting the plane of rotation of the rotor blades or by cyclic pitch control of the rotors.

INVENTOR
WILLIAM N. ROSTA
ATTORNEY

INVENTOR
William N. Rosta
BY
ATTORNEY

INVENTOR
WILLIAM N. ROSTA
ATTORNEY

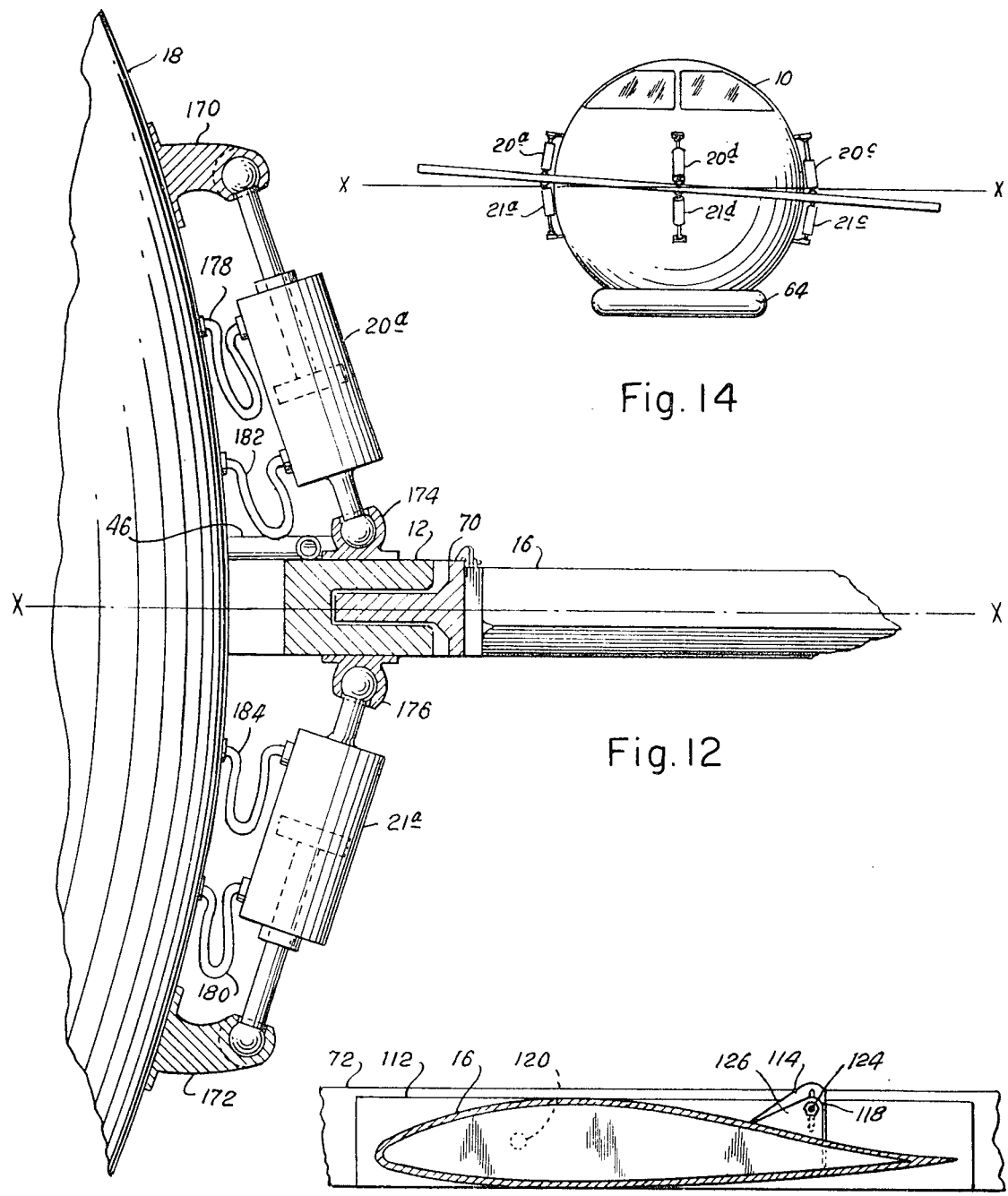

PATENTED JAN 4 1972 3,632,065

INVENTOR
WILLIAM N. ROSTA

BY
ATTORNEY

FIG. 18-A

INVENTOR
WILLIAM N. ROSTA

BY

ATTORNEY

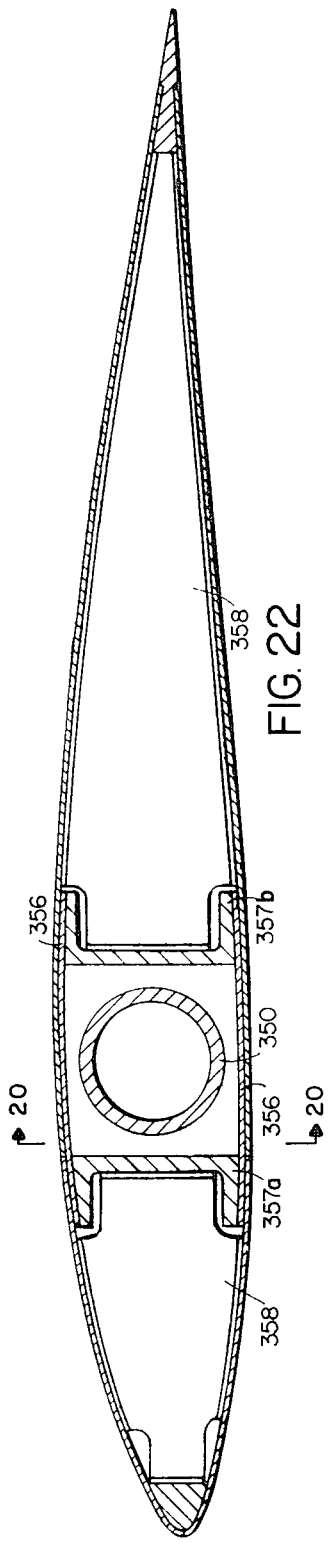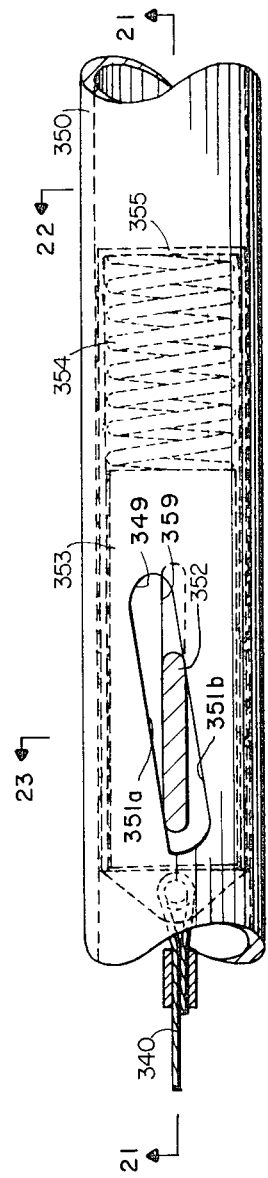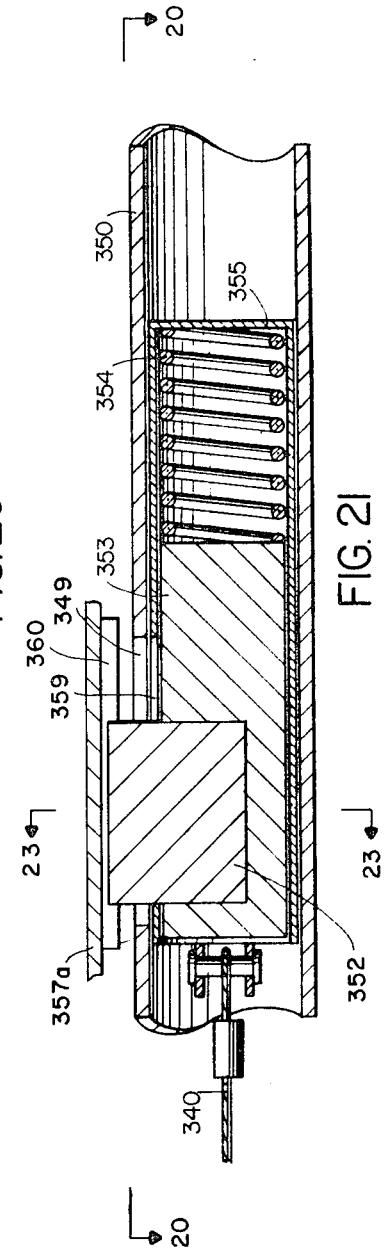

INVENTOR
WILLIAM N. ROSTA

ATTORNEY

INVENTOR
WILLIAM N. ROSTA

ATTORNEY 3,632,065

ROTARY WING AIRCRAFT

This application is a continuation-in-part of my copending application Ser. No. 646,598, now U.S. Pat. No. 3,507,461, filed June 16, 1967, for Rotary Wing Aircraft, which is a continuation-in-part of my copending application Ser. No. 564,801, filed July 13, 1966, now abandoned, for Rotary Wing Aircraft.

BACKGROUND OF THE INVENTION

Although many different configurations have been proposed for a vertical lift aircraft, the only type that has to date been accorded any degree of acceptance is the helicopter. The helicopter is normally provided with four airfoils which are positioned in a generally horizontal plane and are driven to produce vertical lift. These airfoils are generally quite long and must be balanced with a high degree of accuracy. Further, it is necessary that the airfoils be capable of rotation on their own longitudinal axis in order to compensate for the difference of air pressure on opposite blades of the propeller when in horizontal motion. Since the blades of the helicopter are usually relatively long and a substantial portion of the lifting force is accomplished by the portion of the airfoil nearest the ends of the blade, substantial forces are created on the hub to which the airfoils are connected, further increasing the difficulty in mounting the airfoils to the rotating hub in such a manner as they can be pivoted to accomplish the necessary feathering action. The drive mechanism for such blades is therefore extremely complicated and expensive and usually quite heavy.

The torque created as the main lifting blades turn creates a tendency for the body of the helicopter to turn in an opposite direction. Accordingly, it is necessary in helicopters that a tail boom be provided to which a smaller propeller is affixed for creating a thrust to counteract the tendency of the body to turn. As a result of this construction, the helicopter has a definitely established direction of forward movement and it is necessary for the helicopter to turn through a relatively wide arc if the direction of travel is to be changed. A helicopter does not therefore possess the degree of maneuverability desired in many instances. In general, the power required to drive a helicopter is much greater than that required for more conventional aircraft with the same or even greater load carrying capacity and speed capabilities, further increasing the cost.

The present invention provides an improved vertical lift machine in which the airfoils move in a path defined by two concentric, oppositely disposed members. FUrther, in accordance with the principles of the present invention, the airfoils are driven by a low-pressure operated pneumatic means similar in many respects to a conventional turbine. In view of this unique construction, the necessity for a complicated driving mechanism for the airfoils is eliminated. The body of the vehicle is suitably a sphere with the members mounted in a substantially horizontal plane passing through the major diameter of this sphere. The airfoils can therefore be made relatively short as compared to a conventional helicopter but yet the radius traversed by the airfoil and, accordingly, the lifting capacity of the airfoil is comparable to that of the longer helicopter airfoils. A cyclic pitch control for the airfoils may be provided for directional control. Alternatively, the lifting mechanism may be suitably connected to the body of the aircraft in such a manner that the plane in which the lifting mechanism lies can be varied to create the horizontal thrust in any desired direction, making it feasible for the aircraft to move horizontally in any direction without the necessity for turning in the manner required of a helicopter or conventional aircraft.

In accordance with one embodiment of the present invention, a fixed or rigid outer track may be used, and directional control is provide by tilting the tracks. To this end, there are provided first and second concentric tracks which are connected together into a unitary structure. There is also provided first and second ring structures which move in the first and second tracks, respectively. The airfoils are connected at each end to the first and second rings, suitably in such a manner that the angle of attack of the airfoils can be varied. The rings and airfoils therefore define a second unitary structure. The lifting mechanism comprising the first and second unitary structures is connected to the body of the aircraft, which is suitably of spherical configuration, by elements which can be operated to cause the angle of the plane passing through the lifting mechanism to a horizontal plane passing through the body to be varied as desired to cause horizontal thrust to be produced in any desired direction. In accordance with one embodiment of the invention, eight pneumatic cylinders are utilized for this purpose, there being four of the cylinders connected to the upper surface of the inner track and four other cylinders connected to the lower surface of the inner track in opposing relationship to the four upper cylinders. It will be noted, however, that three or more such cylinders or other mounting means could be used in practicing the invention, although the controls are simplified by the utilization of four such cylinders. Further, in accordance with the preferred embodiment of the invention, the outer ring is provided with a plurality of blades which move within the outer track. These blades can be of many different configurations but are suitably shaped similar to that used in conventional turbines. There is also provided means for applying fluids under pressure against these blades to produce rotation of the unitary structure comprising the inner and outer rings and the airfoils connected thereto in the inner and outer tracks. In accordance with the preferred example of the invention, air under relatively low pressure is utilized for driving the second unitary structure in a manner similar to that in which a turbine is driven. However, it will be noted that other fluids, such as heated gases or steam, can be utilized.

In accordance with another embodiment of the invention, a rotary wing aircraft is provided in which the rotor blades or foils are permitted to "cone" rather than being fixed. This permits the structure supporting the outer track to be less rigid as it does not have to hold the rotor blades in a fixed position. Also, this embodiment uses cyclic pitch control for directional control rather than tilting the plane of rotation of the blades. A collective pitch control to provide constant rotor speed may be combined with the cyclic pitch control. The nozzle angle for the turbine drive in the outer track may be such that the counter rotation problem is obviated.

DRAWINGS

Many objects and advantages of the invention will become readily apparent to those skilled in the art as a detailed description of various embodiments of the invention unfolds, when taken in conjunction with the appended drawings wherein like reference numerals denote like parts and in which:

FIG. 11 is a view taken along line 11—11 of FIG. 10;

FIG. 12 is a view taken along line 12—12 of FIG. 2;

FIG. 14 is an elevational view illustrating the manner in which horizontal motion of the aircraft can be accomplished in the embodiment of FIGS. 1-13;

FIG. 18A is a sectional view taken along the line 18A—18A in FIG. 18;

Figure 16:
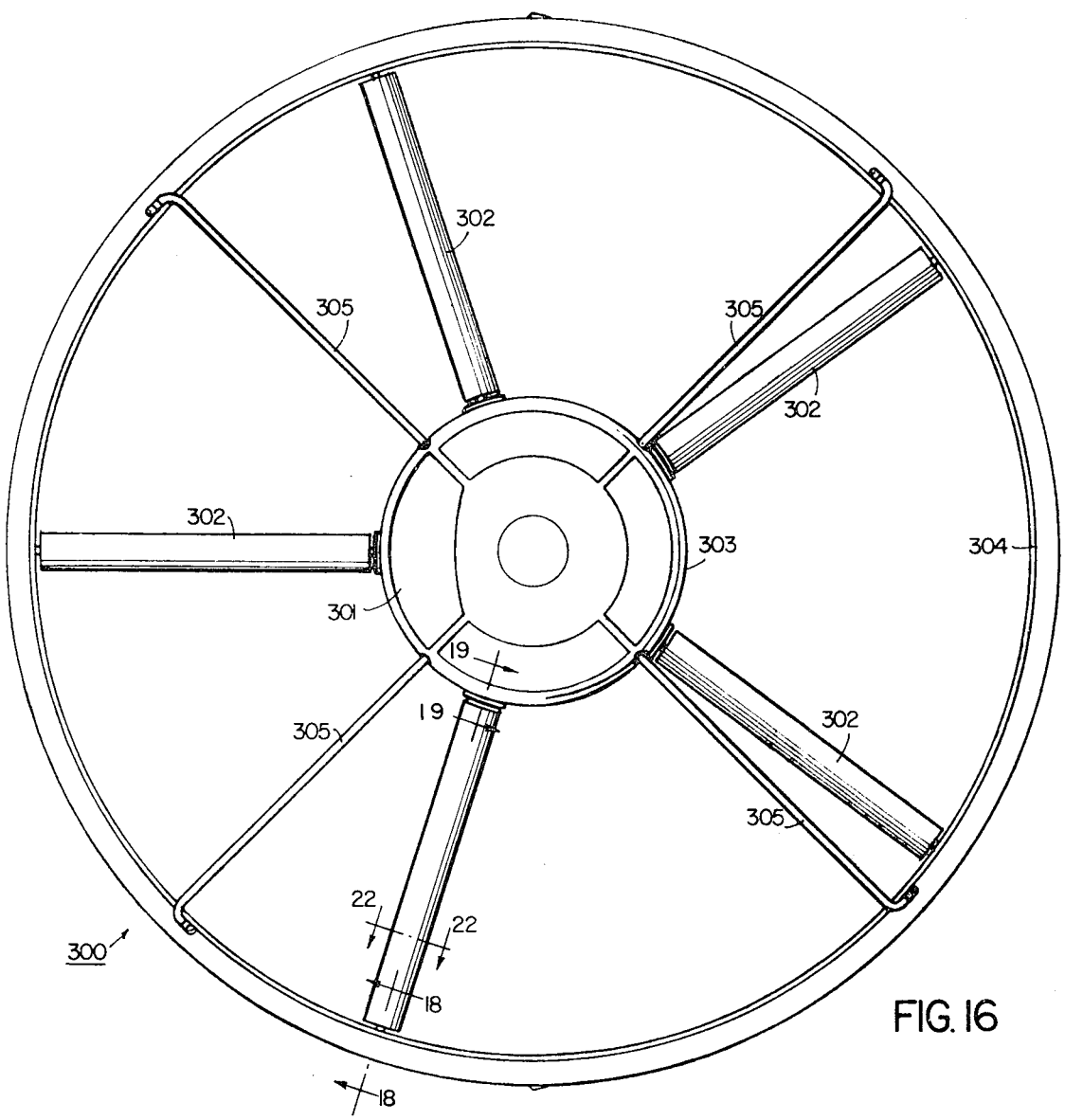
FIG. 16 is a plan view of the aircraft of FIG. 15.
Figure 15:
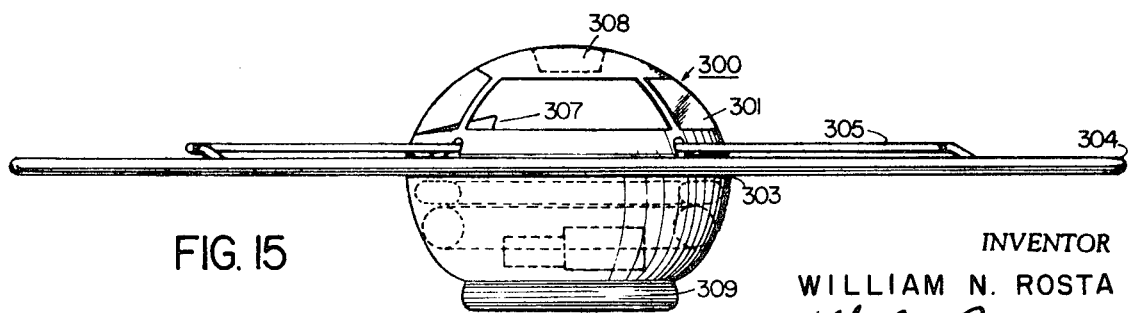
FIG. 15 is an elevational view of a rotary wing aircraft in accordance with another embodiment of the invention.
Figure 23:
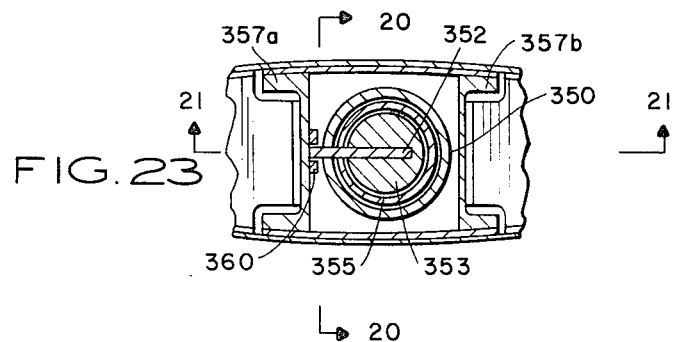
Figure 24:
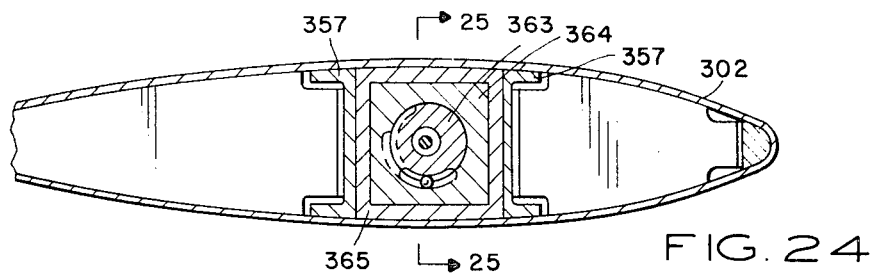
Figure 25:
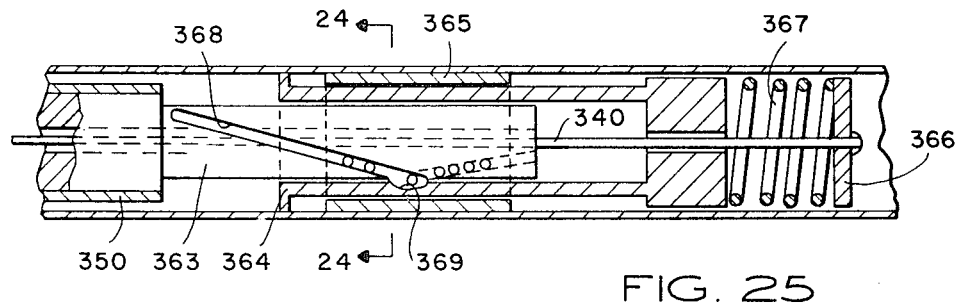
Figure 28:
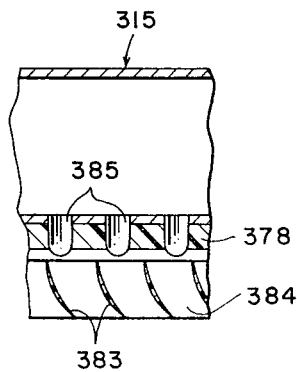
Figure 29:
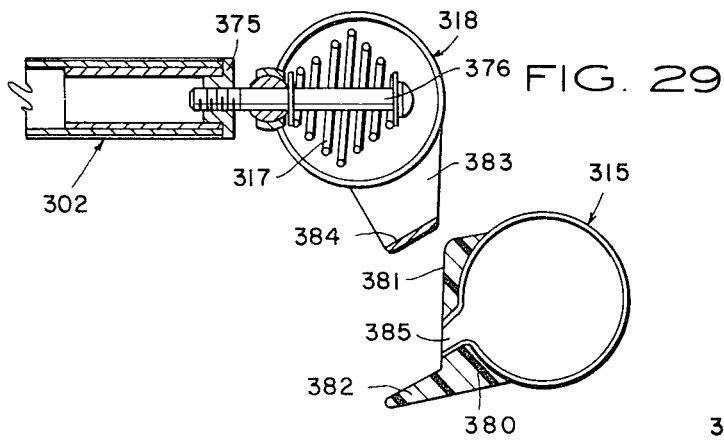
Figure 30:
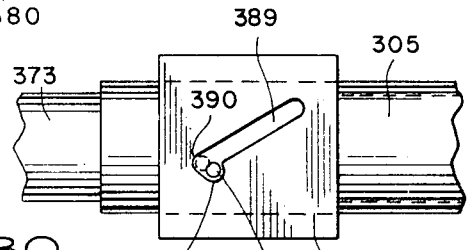
Figure 26:
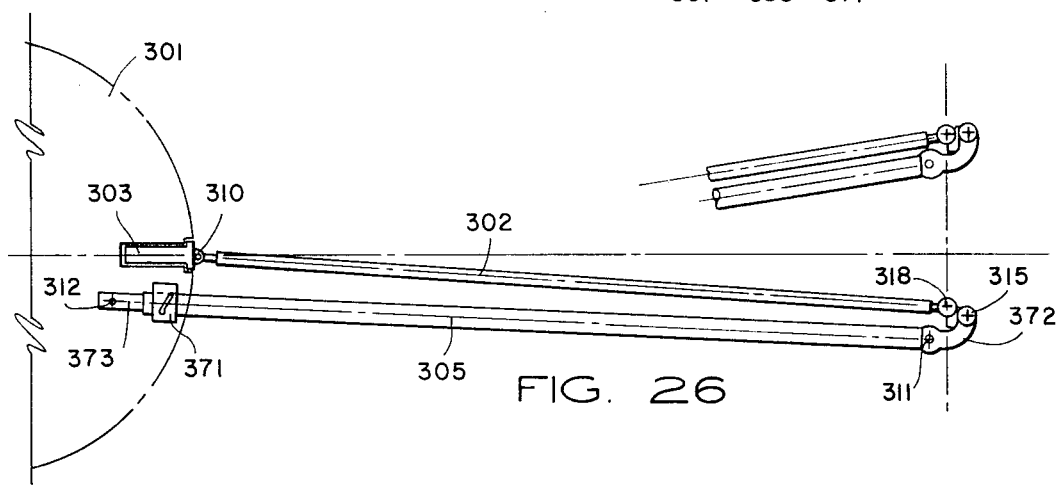
Figure 27:
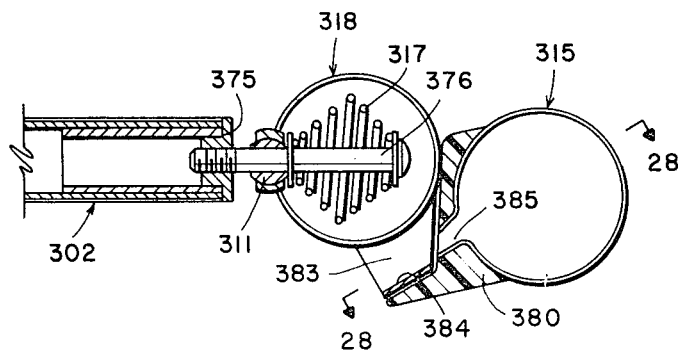

FIG. 20 is an elevation view of the pitch control mechanism in one of the rotor blades for the aircraft of FIGS. 15 and 16, as viewed along the lines 20—20 of FIGS. 21, 22 and 23;

FIG. 21 is a sectional view of the device of FIG. 20 as viewed along the lines 21—21 of FIGS. 20 and 23;

FIG. 22 is an elevation view in section of one of the rotor blades of the aircraft in FIGS. 15 and 16, as viewed along the lines 22—22 of FIG. 20;

FIG. 23 is a sectional view of the pitch control mechanism as viewed along the lines 23—23 of FIGS. 20 and 21;

FIG. 24 is an elevational view in section of one of the rotor blades in the aircraft of FIGS. 15 and 16, showing an alternative form of pitch control mechanism;

FIG. 25 is a sectional view of the pitch control mechanism as viewed along the line 25—25 of FIG. 24;

FIG. 26 is an elevational view in section of an alternative form of strut and rotor blade assembly for the aircraft of FIGS. 15 and 16;

FIG. 27 is a detail sectional view in a radial plane of the outer portion of the rotor assembly of FIG. 26;

FIG. 28 is a fragmentary sectional view taken along the line 28—28 of FIG. 27;

FIG. 29 is a detailed sectional view, based on FIG. 27, showing the outer portion of the rotor assembly in axially separated condition; and FIG. 30 is a fragmentary detail view of the strut supporting structure shown in FIG. 26.

DESCRIPTION OF THE EMBODIMENT OF FIGURES 1 THROUGH 14

Figure 1:
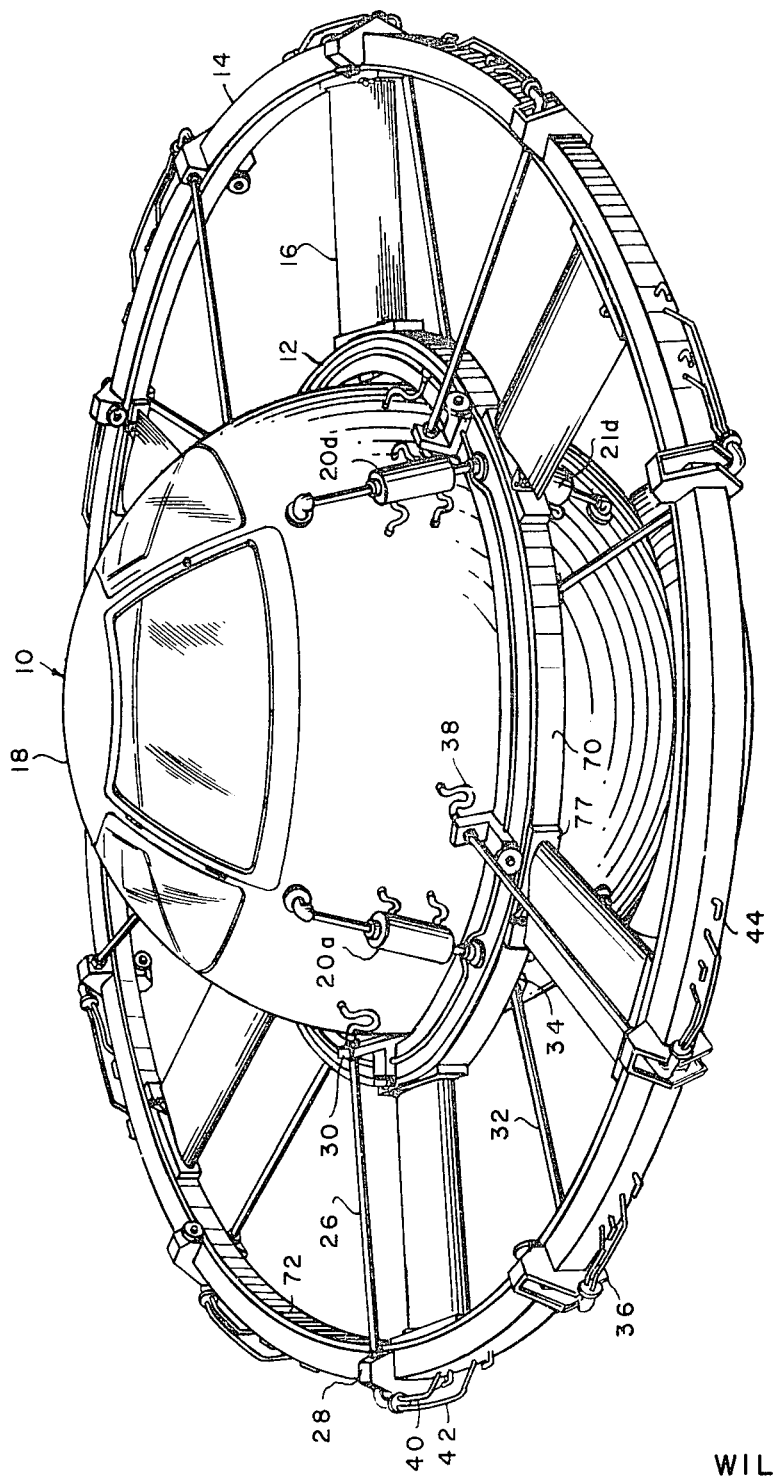
FIG. 1 is a perspective view of a rotary wing aircraft in accordance with one embodiment of the present invention.

Turning now to FIG. 1 of the drawings, there is shown a perspective view of a vertical lift machine in accordance with one embodiment of the present invention, designated generally by the reference character 10. The machine 10 can be seen to comprise an inner track 12 and an outer track 14 positioned in spaced-apart relationship. The tracks 12 and 14 are concentric and oppositely disposed. A plurality of airfoils 16 move in a path defined by the tracks 12 and 14. The airfoils 16 are driven about the path defined by tracks 12 and 14 pneumatically. There is also provided a body 18 which suitably encloses the passengers and equipment associated with the machine. The body 18 is suitably connected to the inner track 12 by a plurality of pneumatic cylinders. There is suitably provided eight of the pneumatic cylinders. Four of the cylinders 20A-20D are positioned on the upper side of the track 12 on 90° spacings, the remaining four cylinders 21A-21D being attached to the under side of the track 12 in opposed relationship to those connected to the upper side. By controlling the pneumatic cylinders 20 and 21 it is possible to control the angle of the plane defined by the tracks 12 and 14 relative to a horizontally disposed plane passing through a diameter of the spherical body 18. In operation of the machine, if the cylinders 20 and 21 are adjusted such that the plane defined by the tracks 12 and 14 is coplanar with the horizontally disposed plane of the spherical body 18, lateral thrust will not be provided and the apparatus will move substantially vertically. By controlling the cylinders 20 and 21 such that the plane defined by the tracks 12 and 14 is inclined, the apparatus will be driven through the air in the direction of the inclination. Thus, by controlling the direction of inclination of the plane defined by the tracks 12 and 14 and the amount of inclination, it is possible to control the direction of movement of the aircraft. It will be appreciated that the machine is completely symmetrical and that the direction in which the pilot faces is arbitrarily considered the front of the aircraft. However, due to the unique configuration, it will be possible for the aircraft to move in any desired direction.

Figure 2:
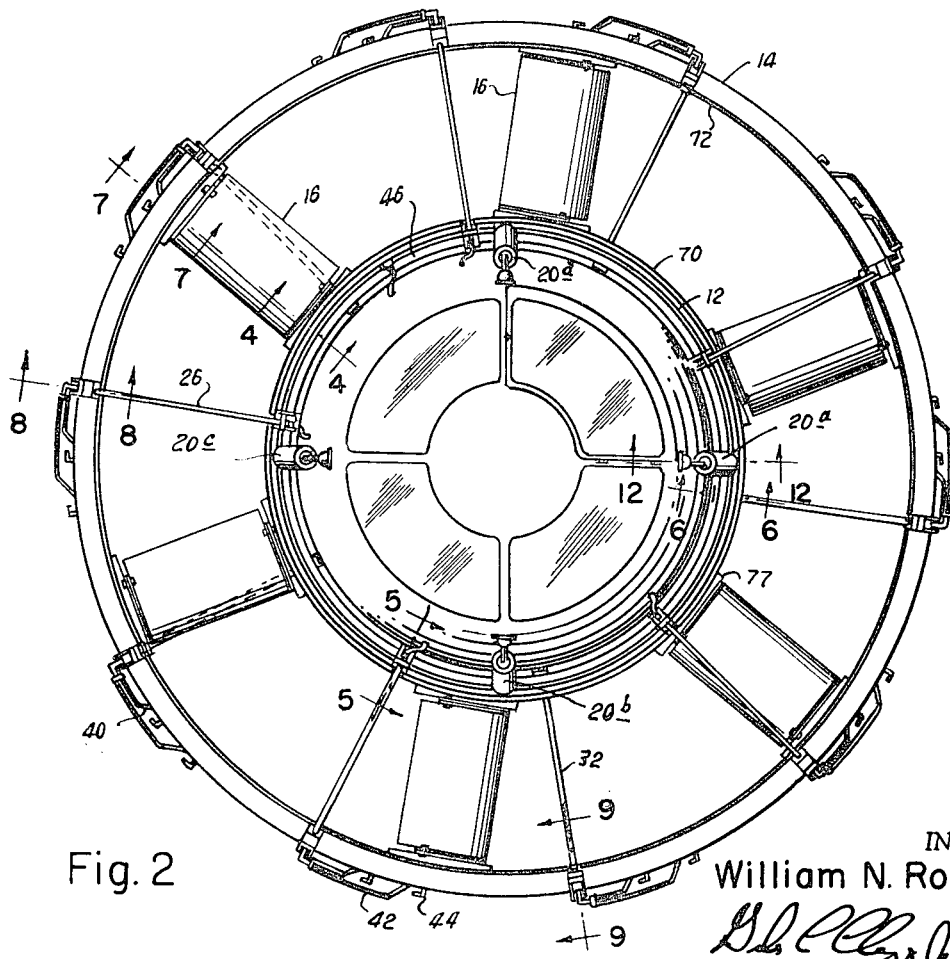
FIG. 2 is a plan view of an aircraft of FIG. 1 in accordance with one embodiment of the present invention.

There is also provided a plurality of tubular members 26 which extend between brackets 28 and 30. It can be seen that the brackets 30 are attached to the upper surface of the inner track 12 and brackets 28 are attached to the upper surface of the outer track 14. Similarly, there is provided a plurality of tubular members 32 which extend between brackets 34 attached to the lower surface of the inner track 12 and brackets 36 attached to the lower surface of the outer track 14. As best seen with reference to FIG. 2, in accordance with the preferred embodiment of the invention, there is provided five of the tubular members 26 and five of the tubular members 32. Members 26 and 32 are arranged symmetrically such that the spacing between each of the members 26 is 72°, the spacing between each of the members 32 is 72° and the spacing between members 26 and 32 is 36°. On the other hand, it can be seen that in accordance with a preferred embodiment of the invention there is provided six of the airfoils 16. Only one of the tubular members 26 will ever be positioned directly over one of the airfoils, minimizing disruption in the laminar flow of the air over the airfoil surfaces. Thus, as shown in FIG. 2, one of the tubular members 26 will begin to pass over one of the airfoils 16 as another one of the tubular members leaves the surface of the airfoil. Similarly, substantially only one of the lower tubular members 32 will be in a position to disrupt the flow of air over an airfoil for the same reasons, also as illustrated in FIG. 2. It will also be noted that the flow of air over the airfoil surfaces is affected on oppositely disposed ones of the airfoils, minimizing any disruption in the overall lift characteristics. It will be appreciated, however, that both the number of airfoils and the number of tubular members can be different from that shown and described.

One end of each of the tubular members 26 is connected by means, suitable a flexible hose 38, to a supply of air under pressure. The opposite end of each tubular member 26 is connected through lines 40 and 42 to orifices directed to the interior of outer track 14.

As will be described in greater detail as the description of the invention unfolds, there is positioned within the outer track an annular member having a plurality of turbine-type blades mounted on its outer periphery. The air discharged from the orifices connected to lines 40 and 42 impinges upon the turbine blades causing movement of the airfoils 16. There is also provided exhaust nozzles 44 associated with each of lines 40 and 42 which provides an exhaust passage for the air used for driving the airfoils. The exhaust nozzles are suitably adjustable such that the stream of air discharged from each of the exhaust nozzles can be used for the purpose of creating counteracting torque in opposition or other external forces generated in the course of flight. By controlling the direction in which the exhaust nozzles 44 face, it is possible to use the exhaust streams for the purpose of controlling rotation of the apparatus. Thus, it is possible to permit rotation of the apparatus to change the orientation thereof and also to prevent rotation during straight flight. There is also shown in FIGS. 1 and 2 a pneumatic header of circular configuration, designated by the reference character 46 which functions to supply the air to a pneumatic bearing utilized in conjunction with the inner track 12 in accordance with the preferred embodiment of the invention.

Figure 3:
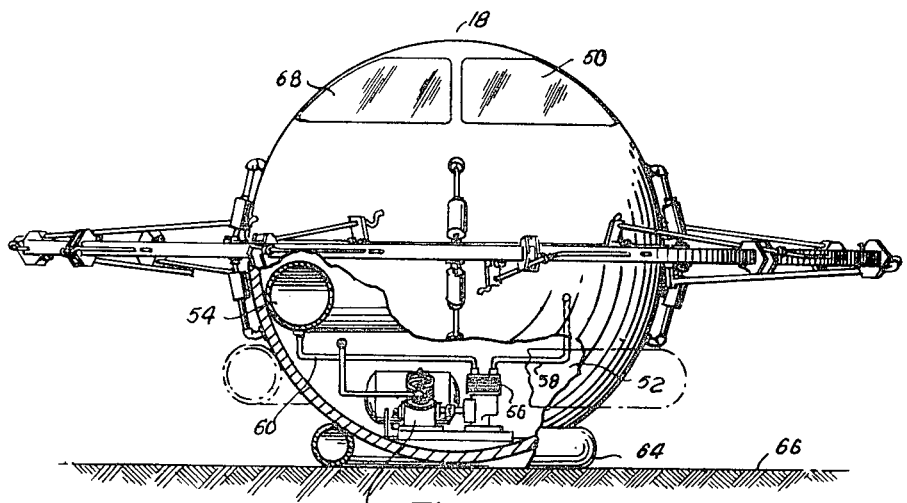
FIG. 3 is a side elevational view of an aircraft of FIGS. 1 and 2 in accordance with one embodiment of the present invention.

As best shown in FIG. 3 of the drawings, the body 18 of the apparatus is suitably of spherical configuration and which is divided into an upper passenger compartment 50 and a lower machinery compartment 52. Positioned within the machinery compartment 52 is an annular air reservoir 54 which is suitably of circular cross section for maximum structural strength. Air is pumped into the reservoir 54, suitably from a pump 56 having its inlet connnected to the atmospheric pressure through line 58 and its outlet connected by line 60 to the reservoir 54. The pump 56 is suitably driven by motor 62 which can be a conventional gasoline-powered motor.

Positioned around the lower end of the body 18 is a resilient member 64 which supports the vehicle when landed. The member 64 is suitably a pneumatic member of circular cross section filled with air to the necessary pressure to support the vehicle but yet provide the necessary cushioning effect. Further, the members 64 can be sufficiently large to provide the necessary buoyancy for operation from water landing sites. It is preferred, however, that for water landings a supplemental member similar in form to member 64 will be positioned in a plane above that of member 64 but below the lifting mechanism for greater stability in the water and that additional buoyant member or members be provided about the periphery of the lifting mechanism. An airline, not shown in FIG. 3, is suitably provided for permitting pressure into the volume enclosed by the bottom of the body 18, the member 64 and the surface 66 upon which the apparatus rests for the purpose of breaking any vacuum which may be created during lift-off, particularly from water. Further, by creating a relatively low-pressure level within the volume described, a ground effect is created which makes it possible to easily move a vehicle along a surface without the necessity for wheels.

The passenger compartment 50 is provided with windows 68 through which the pilot and passengers can look out and necessary seats and control panels and cargo gear, none of which are shown.

Figure 4:
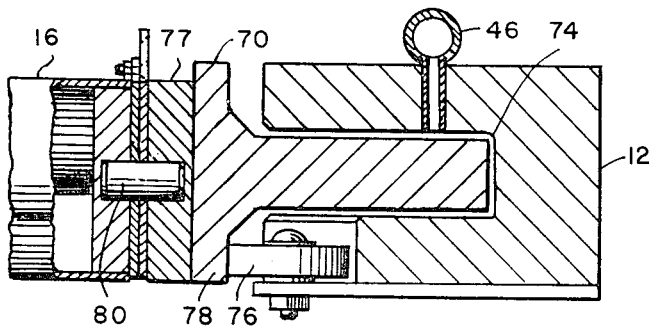
FIG. 4 is a cross-sectional view taken along line 4—4 of FIG. 2.
Figure 5:
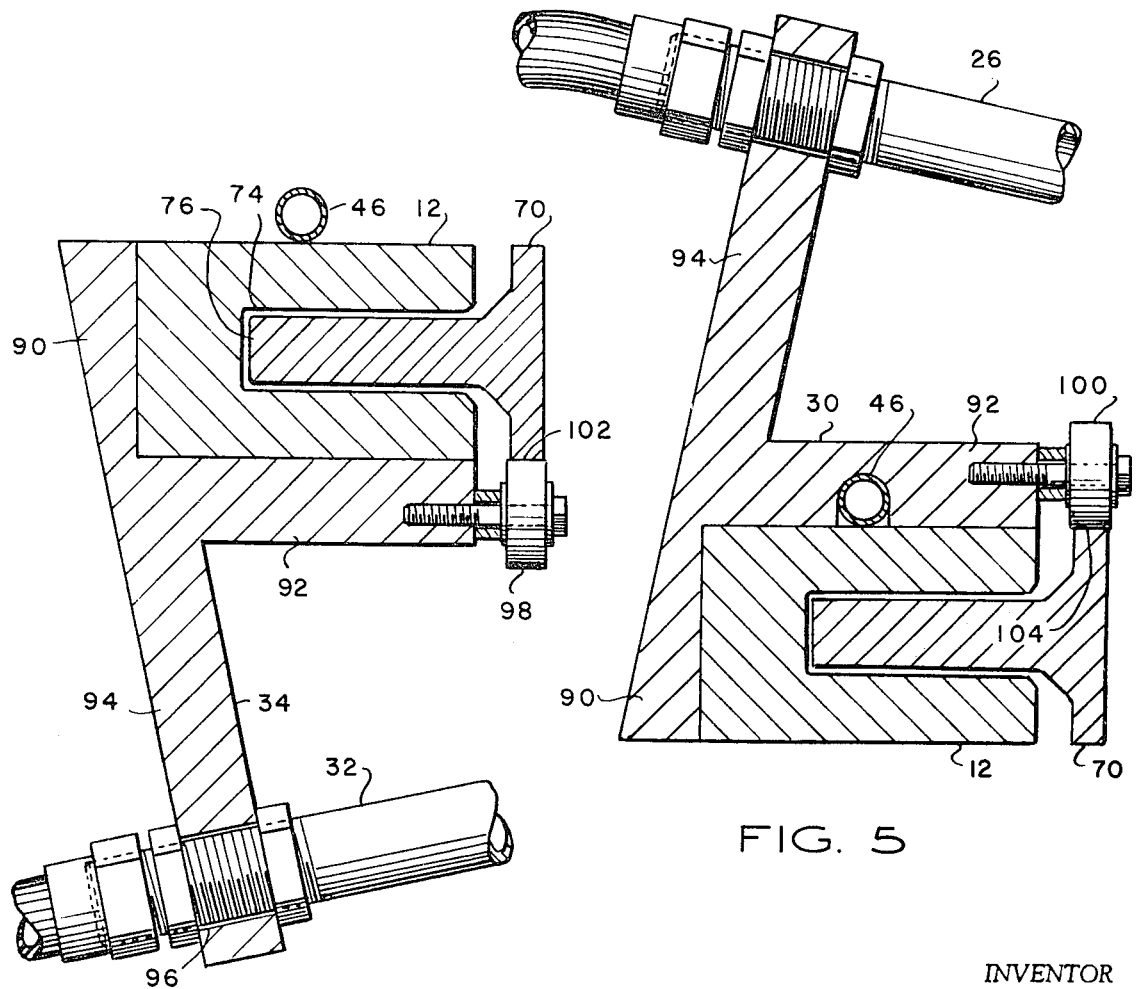
FIG. 5 is a cross-sectional view taken along line 5—5 of FIG. 2.
Figure 6:
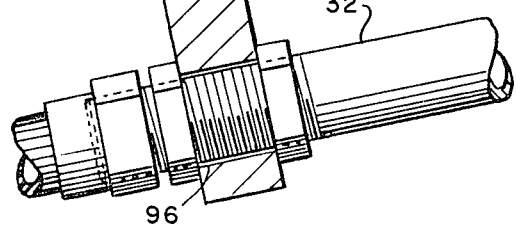
FIG. 6 is a cross-sectional view taken along line 6—6 of FIG. 2.

An inner supporting ring 70 and an outer supporting ring 72 are provided in accordance with the preferred embodiment of the invention. The airfoils 16 are supported between the ring members 70 and 72 with the inner ring 70 being engageable with the inner track 12 and the outer ring 72 being engageable with the outer track 14. The constructional details of the inner track 12 and the bracket members 30 and 34 associated therewith are shown in FIGS. 4, 5 and 6 of the drawings. Thus, it can be seen that the inner ring 12 is suitably of a U-shaped configuration in cross section defining a groove 74 in which a rim portion 76 of the inner ring 70 moves. Positioned about the periphery of the inner ring 12 are a plurality of bearing members 76 which engage the surface 78 of the inner ring 70 for the purpose of centering the inner ring 70 with respect to the inner track 12. In accordance with the specific example of the invention, five of the bearing members 76 were provided. Also, as shown in FIG. 4, there is provided a plurality of passageways in the inner ring 12 wherein communication is provided between the manifold 46 and the groove portion 74 of the inner ring 12. Air pressure provided in the groove 72 as a result of flow of air from the manifold provides the function of a bearing which prevents intimate contact between the surfaces of the rim portion 76 of the ring 70 and the groove portion 74 of the inner track. Each of the airfoils 16 is suitably connected at one end to a mounting block 77, suitably by a pin 80 whereby the angle of the attack of the airfoil 16 may be varied. The support or bracket members 30 and 34 are shown in FIGS. 5 and 6 of the drawings, and the similarity between the two will become readily apparent, the principle difference being the difference in orientation. Each of the bracket members 30 and 34 can be seen to comprise a pair of leg members 90 and 92 adapted to lie over and be connected to the surfaces of the inner ring 12 and having a body portion 94 extending away from the inner track 12. An opening 96 is provided in the end of the body portion 94 through which the tubular members 26 and 32, respectively, pass. Each of the bracket members 30 and 34 suitably carries a bearing 100 and 98, respectively, which cooperate for vertical positioning of the ring 70 and which bear upon surfaces 104 and 102 of the ring 70, respectively. The bearings 76, 98 and 100, in conjunction with the bearing effect produced by air from the manifold 46, cooperate to define a path in which the inner ring 70 moves.

Figure 7:
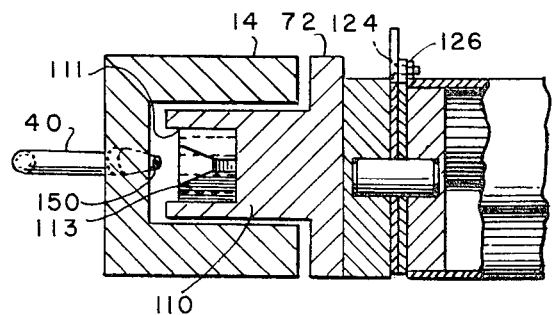
FIG. 7 is a cross-sectional view taken along line 7—7 of FIG. 2.
Figure 8:
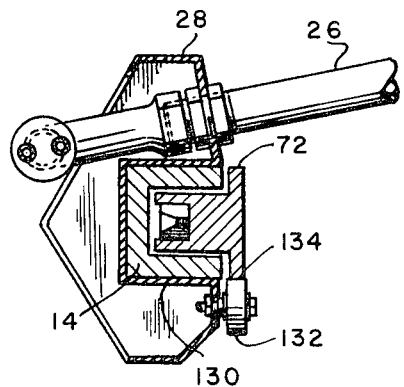
FIG. 8 is a cross-sectional view taken along line 8—8 of FIG. 2.
Figure 10:
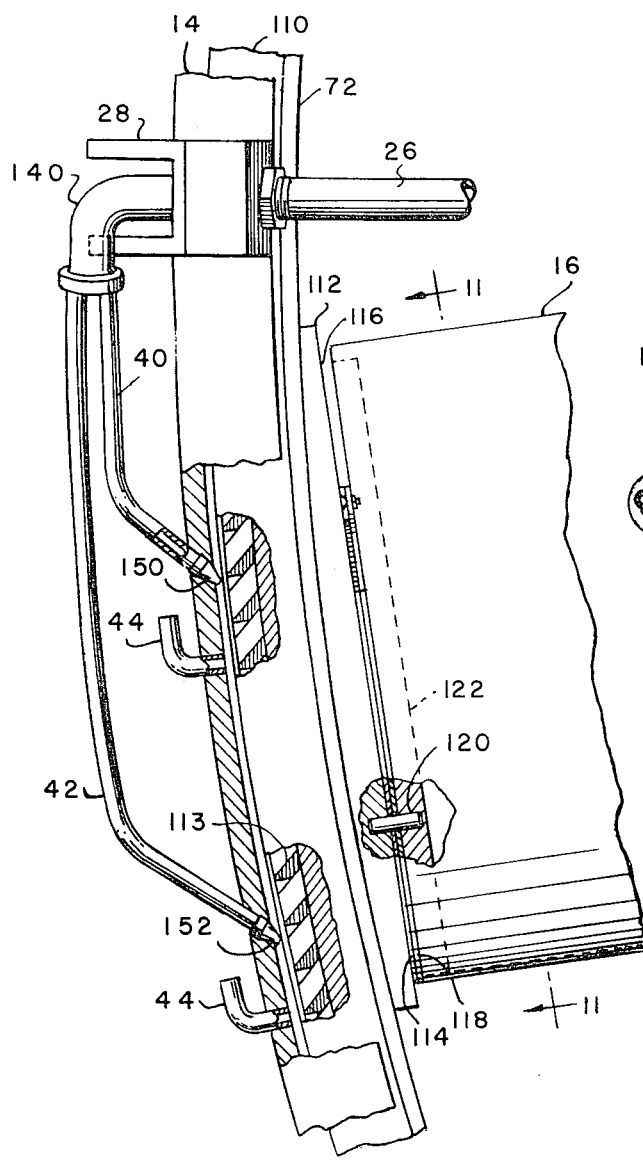
FIG. 10 is a plan view, partially in cross section, of a portion of the outer ring and outer track utilized in accordance with the embodiment of the invention as in FIGS. 1-9.

The outer track 14 and the outer ring 72 are shown in greater detail in FIGS. 7, 8 and 10 of the drawings. Thus, it can be seen that the outer track 14 is also of U-shaped configuration in cross section adapted to receive the rim portion 110 of the outer ring 72. The outer edge of the rim 110 is shaped to define an annular groove 111 within which is fitted a plurality of blades 113. In a manner similar to that described with respect to the inner ring, at each point to which one of the airfoils 16 is to be attached to the outer ring 72, there is provided a mounting block 112 having a plate 114 mounted onto the surface 116. Similarly, the end of the airfoil 16 to be attached to the outer ring 72 is provided with a plate 118. The actual connection between the airfoils 16 and the mounting block 12 is by means of a pin 120 which engages both the mounting block 116 and the end structural member 122 of the airfoils 16. Airfoils are therefore pivotally connected to the mounting block 112 carried by the outer ring 72. The angle of attack of the airfoil 16 can be controlled by the relationship between the plates 114 and 118, as best shown in FIG. 12 of the drawings. Thus, one of the plates 114 and 118 is suitably slotted such that the angle of attack can be varied but positioned at a desired angle by tightening the screw and nut 124.

Figure 9:
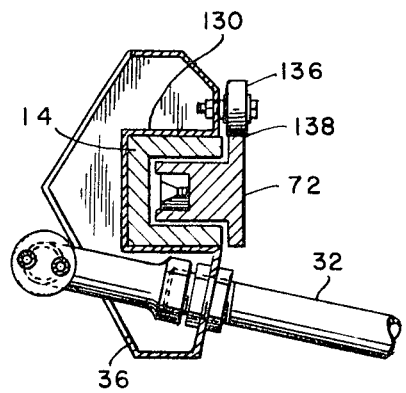
FIG. 9 is a cross-sectional view taken along line 9—9 of FIG. 2.

As best shown in FIGS. 8 and 9, the mounting brackets 28 and 36 are of similar construction and each shaped to define a channel portion 130 which fits over the outer track 14. Further, each of the mounting brackets 28 and 36 are adapted to receive and be connected to the tubular members 26 and 32, respectively, for the purpose of supporting the outer track 14 in concentric, opposed relationship to the inner track 12. The bracket member 28 carries a bearing 132 which engages the lower surface 134 of the outer ring 72. Similarly, the bracket members 36 each carry a bearing member 136 which is engageable with the surface 138 of the outer track 72. The bearings 132 and 136 cooperate to maintain the vertical position of the outer ring 72 relative to the outer track 14. It is to be noted that bearing members 76 associated with the inner track 12 position both the inner ring 70 and the outer ring 72 insofar as horizontal movement is concerned.

There is shown in greater detail in FIG. 10 of the drawings the operative relationship between the outer ring 72 and the outer track 14 and the associated parts. Thus, it can be seen that tubing members 40 and 42 are connected at one end to the fitting 140 which, in turn, is connected to one of the tubular members 26, as shown, or the tubular member 32.

Tubing members 40 and 42 are each suitably provided with nozzles 150 and 152, respectively. Nozzles 150 and 152 are each positioned such that a stream of fluids flowing outwardly therefrom will impinge directly upon the face of the blades 114 in order that the maximum amount of force may be created. It can therefore be seen that the drive mechanism of the aircraft, in accordance with the preset invention, is essentially that of a turbine. Accordingly, many different types of fluids, such as hot gases or steam, can be utilized in practice of the invention wherein the blade configuration and positioning can be varied in many ways similar to that of more conventional turbines. Also, the position of the nozzles can be varied, as, for example, directing the stream of gases in a substantially vertical plane.

It will be appreciated that the lifting mechanism can be carried by and driven from the inner ring 70 and driven through the inner track 12, in which event the outer track 14 and outer ring 72 could be dispensed with. However, even though the lifting mechanism does not actually contact the outer track 14 it would remain desirable from the safety standpoint in that it would minimize the possibility of the rotating airfoils striking a person or other object. The driving mechanism shown is preferred, however, in that a decided mechanical advantage is obtained by driving the airfoils from the outer track rather than the inner track.

As mentioned previously with respect to FIGS. 1, 2 and 3 of the drawings, the direction of flight is controlled by actuation of the air cylinders 20 and 21 which cooperate to control the attitude of the unitary structure defining the drive system. Thus, as shown in FIG. 12 of the drawings, the drive system will normally be positioned in a horizontal plane X—X. The plane X—X passes through the center of the inner track 12, inner ring 70, the airfoils 16, the outer track 72, and the outer ring 14. This attitude is maintained by the pneumatic cylinders 20A and 21A, shown in FIG. 12. It can be seen that each of the cylinders is connected at one end to body 18 by mounting brackets 170 and 172, respectively. The outer ends of cylinders 20A and 20B are connected to the inner track 12 by mounting brackets 172 and 176, respectively. It can be seen that the brackets 170, 172, 174 and 176 are shaped to provide a ball joint connection between the cylinders 20A and 21A, the body 18 and the inner track 12. Tilting of the driving assembly in any direction will therefore not affect orientation of the cylinders.

Figure 13:
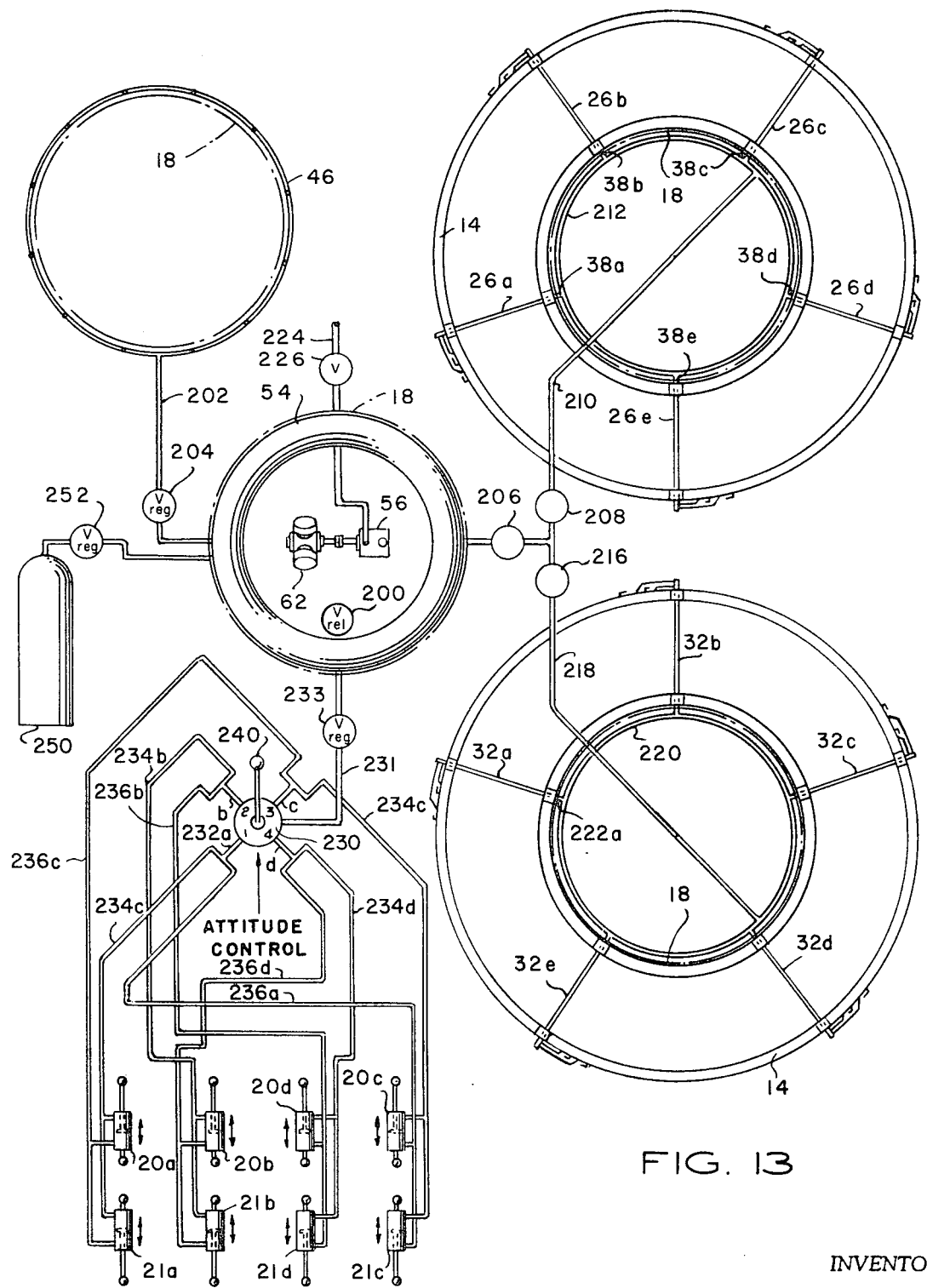
FIG. 13 is a view schematically illustrating a pneumatic system utilized in accordance with the embodiment of the invention as in FIGS. 1-12.

Turning now to FIG. 13 of the drawings, a control system suitable for use in practicing the invention is shown. It can be seen that in accordance with the preferred example of the invention, the propulsion of the aircraft as well as the controls are handled pneumatically. Thus, there is provided a motor 62 which drives a compressor 56 for the purpose of filling reservoir 54 with air under pressure. There is also suitably provided a release valve 200 which functions to shut the motor off whenever the pressure within the tank 54 obtains a desired maximum level and also for releasing air in the event the pressure within the tank should become undesirably high. The tank 54 is connected through line 202 to the air bearing manifold 46 which controls the flow of air into the inner track 12. Regulating valve 204 controls the pressure of air admitted into the air bearing to be at a desired level even though the pressure in the tank may be much higher.

Tank 54 is also connected through valve 206, valve 208 and line 210 to a manifold 212 suitably positioned within a body 18. Manifold 212 is connected by flexible hose members 38A-38E to the tubular members 26A-26E, respectively. Valve 206 is also connected through valve 216 and line 218 to manifold 220. Manifold 220 is also suitably positioned within the body 18. Manifold 220 is connected through flexible members 222A-222E, respectively, to the tubular members 32A-32E, respectively. When valves 208 and 216 are each open, the flow of fluids from the tank 54 to the outer track 14 will be through both the tubing members 26 and 32, each supplying substantially equal amounts of fluid. The speed at which the airfoil is driven can therefore be controlled by controlling the opening of the valve 206 with maximum power being available. If only half power is required or less than half power, one of the valves 208 and 216 can be closed and fluid will be applied to the drive turbine through only half of the available ports.

There is also provided line 224 which is opened at one end and connected by its other end through valve 226 to the reservoir 54. The open end of line 224 communicates with the space enclosed by the member 64 and the lower surface of body 18. When air pressure is admitted into the space through line 224 and valve 226, pressure is created which tends to lift the vehicle 10 from the ground, making it easy to move the vehicle along the surface and also preventing any possibility of a vacuum being created that would increase the difficulty of lift-off.

Control of cylinders 20A-20D and 21A-20D is obtained by a valve 230 having an inlet connected through line 231 and a regulated valve 233 to the reservoir 54. Valve 230 is provided with four outlet lines 232A-232D. The cylinders 20 and 21 are double-acting cylinders; and, therefore, a port which functions as an inlet port for one direction of actuation, functions as an exhaust port for the other direction of actuation. For purposes of the following description, however, the inlet ports of the respective cylinders are those ports which serve to direct fluid to extend the cylinder, while the exhaust ports are those ports which serve to direct fluid to contract the cylinder. The valve outlet line 232A is connected through line 234A to the exhaust port of cylinder 20A and the inlet port of cylinder 21A, and through line 236A to the inlet port of cylinder 20C and the exhaust port of cylinder 21C. Similarly, that line 232C is connected through line 234C to the exhaust port of cylinder 20C and to the inlet port of cylinder 21C, and through line 236C to the inlet port of cylinder port 20A and to the exhaust port of cylinder 21A. Similarly, valve outlet line 232B is connected through line 234B to the exhaust port of cylinder 20B and to the inlet port of cylinder 21B, and through line 236B to the inlet port of cylinder 20D and the exhaust port of cylinder 21D. The valve outlet line 232D is connected through line 234D to the exhaust port of cylinder 20D and to the inlet port of cylinder 21D, and through the line 236B to the inlet port of cylinder 20B and to the exhaust port of cylinder 21B.

The valve 230 is ported such that when the control 240 is in the neutral position, pressure will not be applied from line 231 to any of the output ports or lines 232A-232D. On the other hand, if the control 240 is placed in position 1, pressure will be applied through lines 234A and 236A to the inlet of cylinders 21A and the exhaust of cylinder 20A and to the exhaust of cylinder 21C and to the inlet of cylinder 20C. Thus, when control 240 is moved into position 1, cylinder 21A will be extended and cylinder 20A contracted, causing the portion of the inner track 12 connected to cylinders 20A and 21A to be forced upward with respect to the horizontal plane X—X shown in FIG. 14. Simultaneously, cylinder 20C will be extended and cylinder 21C contracted, causing the portion of the track 12 connected to these cylinders to move downward with respect to the plane. As a result of these actions, orientation of the driving apparatus will be disorientated from the plane X—X as shown in FIG. 14, causing the apparatus to move in the direction of cylinders 20C and 21C. Conversely, if the control 240 is placed in position 3, opposite results will be obtained, resulting in the driving apparatus being tilted from the horizontal plane X—X and the aircraft will move in the direction of cylinders 20A and 21A. Also, in similar fashion, if the control 240 is placed in position 2, the aircraft will move in the direction of cylinders 20D and 21D, and if placed in position 4, the aircraft will move in the direction of cylinders 20B and 21B. If the control is placed in position intermediate positions 1 and 2, pressure will be applied to all of lines 234A, 234B, 236A and 236B, resulting in tilting of the drive mechanism in a direction intermediate cylinders 20C and 20D providing a resultant direction of travel. Thus, any desired direction of movement can be obtained.

It will be appreciated that an important safety factor is provided in the embodiment of the invention disclosed since if the motor 62 or compressor 56 should fail, the supply of air within the reservoir 54 will maintain rotation of the air foils for a substantial period of time. Further, there can be provided one or more cylinders 250 of gas under high pressure that are connected through regulating valve 252 to the reservoir 54. In the event of the failure of the motor and compressor, valve 252 can be operated to admit gas into the reservoir 54 from the cylinder 250, with the cylinder 250 providing an emergency supply of gas under pressure.

It can be seen from the foregoing description that the apparatus of the present invention provides many advantages. Thus, the motor and compressor can be operated at all times at optimum speeds, the control of the aircraft being accomplished through a control of the gases applied to drive the rotor blades. The pneumatic system disclosed in accordance with the preferred embodiment of the invention is extremely reliable and characterized by a high degree of simplicity. Important safety features are obtained through the use of the pneumatic driving system. The apparatus provided by the present invention is readily adaptable for both land and sea operation. Further, an additional safety factor can easily be provided in that the lifting mechanism can be attached to the body in such a fashion to permit quick disconnection thereof in the event the supply of air is exhausted, and a parachute which is only required to support the weight of the body of the aircraft can be provided.

The apparatus provided by the present invention is also characterized by a high degree of maneuverability. Thus, when in the hovering position, by controlling the orientation of the exhaust nozzles 44, the aircraft can be permitted to rotate such that the pilot will be facing in any desired direction without the necessity for horizontal movement of the aircraft. The aircraft is, in addition, capable of vertical ascent and descent and by controlling the plane of the lifting mechanism, horizontal movement in any desired direction can be obtained without necessity for reorientation.

DESCRIPTION OF THE EMBODIMENT OF FIGURES 15 TO 25

In another embodiment of the invention, the airfoils are not maintained in a fixed horizontal position but instead are permitted to flex, and also cyclic pitch control is used rather than the directional control illustrated above. Other features of this embodiment will be apparent from the following detailed description.

With reference now to FIGS. 15 and 16, elevation and top views of a rotary wing aircraft according to the second embodiment of the invention are illustrated. This aircraft 300 includes a fuselage 301 along with a plurality of rotor blades 302, in this case five rotor blades, which rotate about the periphery of the fuselage in a path as defined by an inner track 303 and an outer track assembly 304. The rotor blades 302 are driven by pressurized air of gas directed at turbine blades within the outer track assembly 304 in a manner similar to the embodiment discussed above, as will be described in detail below. The pressurized air or gas is delivered to the outer track by a plurality of struts 305 which are hollow and define ducts. Located within the fuselage 301 is a power plant in the form of a gas turbine of conventional form, driving a low-pressure, high-volume air compressor. Although this aircraft may be constructed in various sizes, it may be noted that for the particular embodiment as will be described, a gas turbine engine of 370 shaft horsepower and air compressor producing about 6,000 cubic feet per minute would be suitable. The engine and compressor would be mounted in the lower part of the fuselage 301 as indicated generally by dotted lines in FIG. 15. In the central part of the fuselage will be located seats for the occupants, and an instrument panel 307 along with suitable controls. An important feature of the invention is the provision of a compartment 308 for a parachute as will be described later. Within the lower section of the fuselage is a landing gear cushion 309 which may be deployed as seen, or this may be permanently positioned on the lower side of the fuselage. Pressurized air may be directed out of the lower part of the fuselage from the compressor to produce a ground-effect-type landing arrangement, or descent may be cushioned merely by the inflated cushion 309 itself.

Figure 17:
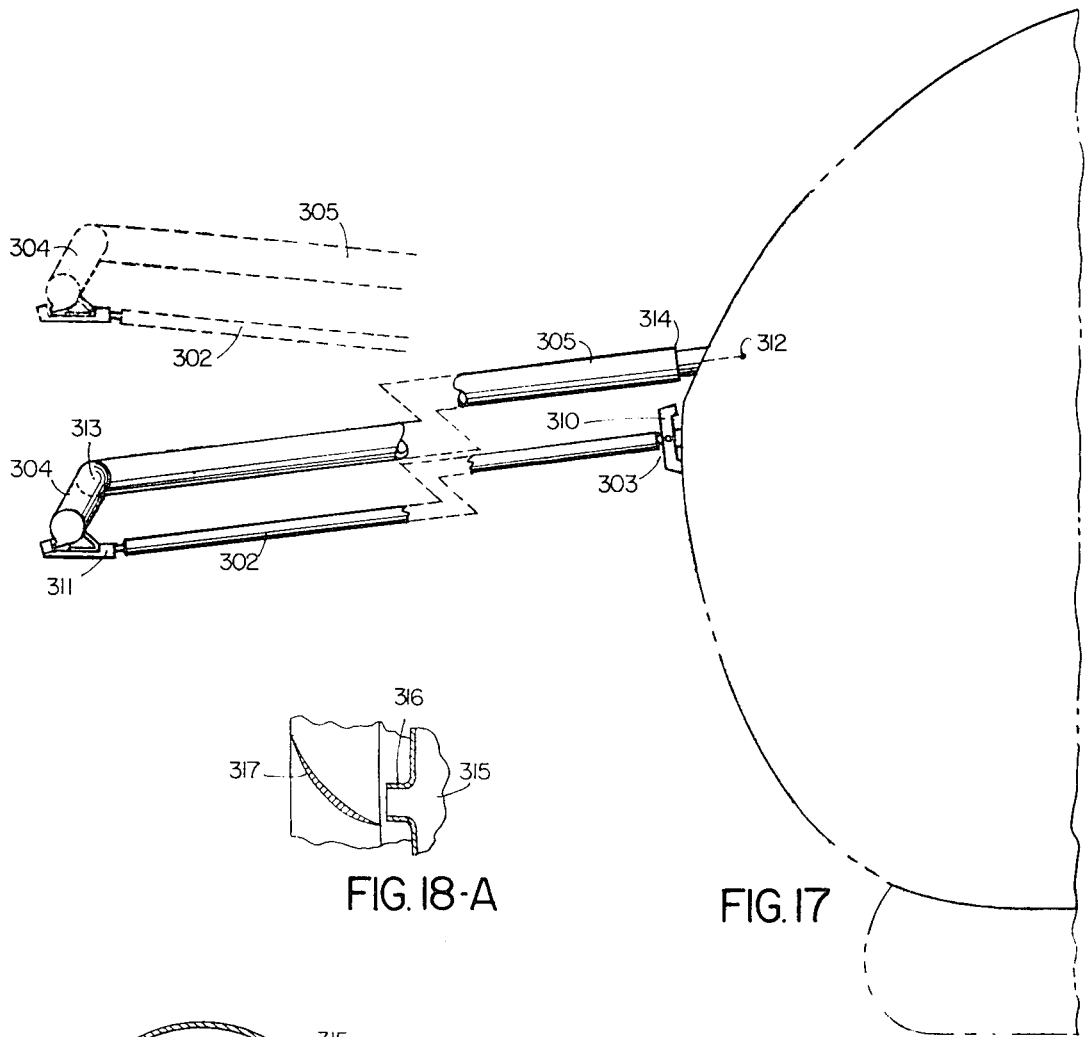
FIG. 17 is an enlarged elevational view in section, of the strut and rotor blade assembly for the aircraft of FIGS. 15-16.

With reference now to FIG. 17, one of the rotor blades 302 and one of the struts 305 are shown in more detail, and the "coning" effect is illustrated. It is noted that when the rotor blades 302 are stationary or rotating very slowly, they will be in a lower position wherein the rotor blades extend down at a slight angle from the horizontal. However, as the speed of rotation of the rotor blades increases, lift will be produced which tends to raise the rotor blades. In contrast to the previous embodiment where the foils or rotors are maintained in a fixed position, the present embodiment permits the rotor assembly to flex upwardly or "cone" so that at high-rotor speeds the assembly will have moved up to the position illustrated in dotted lines in FIG. 17. This is similar in principle to the manner in which the rotor blades in a conventional helicopter are hinged at the hub and free to fold upward. The extent to which the rotor blades cone upward is limited not by the mechanical linkages but instead by the centrifugal force existing in the rotating assembly when turning at high speeds. This force tends to hold the blades toward a horizontal position and is balanced against the lift created by the aerodynamic cross section. In this manner, the need for a structural assembly which will hold the blades in a fixed position is obviated, and the struts 305 along with the outer track need be only constructed to support their own weight when the vehicle is at rest, rather than being constructed to support a large part of the weight of the entire vehicle in flight. To permit coning of the rotor blade assembly, each blade 302 is pivoted at the point where it is connected to the inner track 303 by a hinge assembly 310. Likewise, the rotor blade 302 is hinged at the point where it joins the rotating part of the outer track 304 by a pivoting assembly 311. Likewise, the strut 305 is pivoted about a point 312 where it is joined to the fuselage and is pivoted about a point 313 where it engages the outer track. Since the length of the rotor blades 302 and struts 305 will vary relative to one another depending upon the degree of coning, the strut is permitted to adjust in length by a coupling 314 wherein concentric cylinders or tubes are permitted to slide relative to one another.

Figure 18:
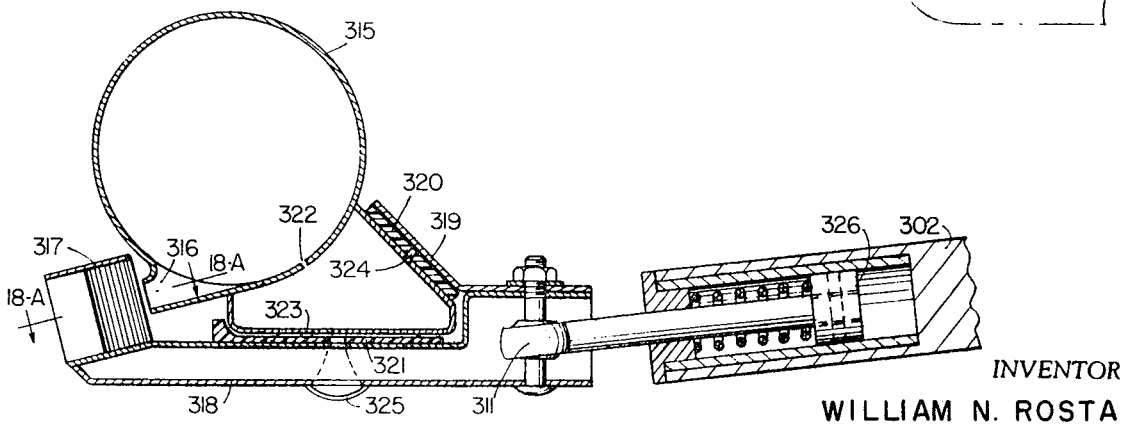
FIG. 18 is an enlarged sectional view of the outer track assembly, taken along line 18—18 in FIG. 16.

With reference now to FIG. 18, a cross-sectional view of the outer track assembly is illustrated, with the outer housing being removed. The stationary portion of the outer track assembly includes a main manifold 315 which is a hollow tube encircling the entire aircraft, constructed perhaps of a suitable plastic, about 3 inches outside diameter. The struts 305 or air conduits are connected to this manifold 315 at their outer ends so that the low-pressure air from the compressor within the fuselage is communicated to this manifold. Along its lower outside edge, the manifold 315 is shaped to define a plurality of turbine nozzles 316 which point almost directly radially outward, rather than at pronounced angles, and which are canted downward from the horizontal about 15°, for example. This angle is selected to balance the reaction produced by the discharge of air from the nozzles against the weight of the outer track so that the outer track will "float." There would be about 250 of these nozzles or one about every 4 or 5 inches spaced around the periphery of the outer track of a vehicle of the size given in this example. Pressurized air from the nozzles 316 is directed against a plurality of turbine blades 317 which are part of the rotating portion of the outer track and are, of course, mechanically connected to the rotor blades to cause rotation thereof. The blades 317 would be spaced about the periphery of the track, perhaps about 1 or 2 inches apart, and since low-temperature air or gas is used, and low velocities are involved, the turbine blades could be composed of a material such as plastic rather than the high-temperature, high-strength, metals usually used for turbine blades.

As will be seen in FIG. 18A, the angle of the nozzle 316 is almost 90° with respect to the direction of rotation of the turbine blades in a tangential direction. Actually, the nozzles are preferably canted forward about 3°, for the purpose of exactly balancing the tendency for the entire vehicle to rotate in a direction opposite to that of the rotation of the rotor blades, as would occur if the nozzles were positioned at an angle pointed into the rotor blades in the direction of their rotation as would be used for maximum nozzle-to-blade efficiency in accordance with standard practice. However, to avoid the necessity of compensating for counterrotation by other means, the nozzles are positioned to be directed almost straight outwardly, or about 3° therefrom, which is not at the maximum efficiency point but which avoids the counterrotation problem. The turbine blades 317 are shaped to produce about 70° of gas deflection, that is, a 70° difference between a tangent to the leading edge and a tangent to the trailing edge. Calculated on the basis of a turbine blade velocity of 500 feet per second needed to rotate the rotor blades 302 at about 330 r.p.m., the exit velocity of air from the nozzles 316 would be about 1,200 feet per second, thus requiring an output from the compressor on the order of about 6,000 cubic feet per minute of air for a gross vehicle weight of about 1 ton, or slightly over. This vehicle would have an overall diameter of about 30 feet, a rotor blade length of about 9 feet, and an outside diameter of the cabin of about 10 feet. A useful load of about 1,100 lbs. would be provided, thus a four place vehicle. Of course, this is merely an example of one size vehicle.

Air bearings are used between the stationary and rotating parts of the outer track as seen in FIG. 18. The turbine blades 317 are all secured to a rotating track 318 which of course is secured to the five rotor blades 302 by the pivot assemblies 311. The rotating track 318 includes an upper bearing portion 319 whereby a bearing area 320 is defined along with a bearing area 321. Air is fed in from the main manifold 315 through a hole 322 into a bearing air manifold 323 which is a hollow ring extending all the way around the periphery of the vehicle. A series of holes 324 permit air to bleed into the bearing area 320 so that the moving part 319 does not touch the stationary part of the outer track but instead rides on a cushion of air. Air for the lower air bearing area 321 is provided by an airscoop 325 of which there are a large number spaced around the bottom of the rotating track 318. The air scoop 325 faces forward and thus upon rotation of the track 318 air is forced up through a conduit into a central part of the bearing area 321 so that when the rotor assembly is rotating at high speed an air bearing is provided. The air feed for the air bearing area 321 could be provided from the manifold 323 by holes, but this would of course dissipate more of the pressurized air from the main manifold whereas the air scoop arrangement produces the bearing air at very little increased drag. It is noted that at the outer end of the rotor blade 302 a spring-loaded piston arrangement 326 is used to permit movement of the rotor blade in a radial direction with respect to the rotating track 318 as would occur upon coning or upon distortion of the rotor blades in rough air.

Figure 19:
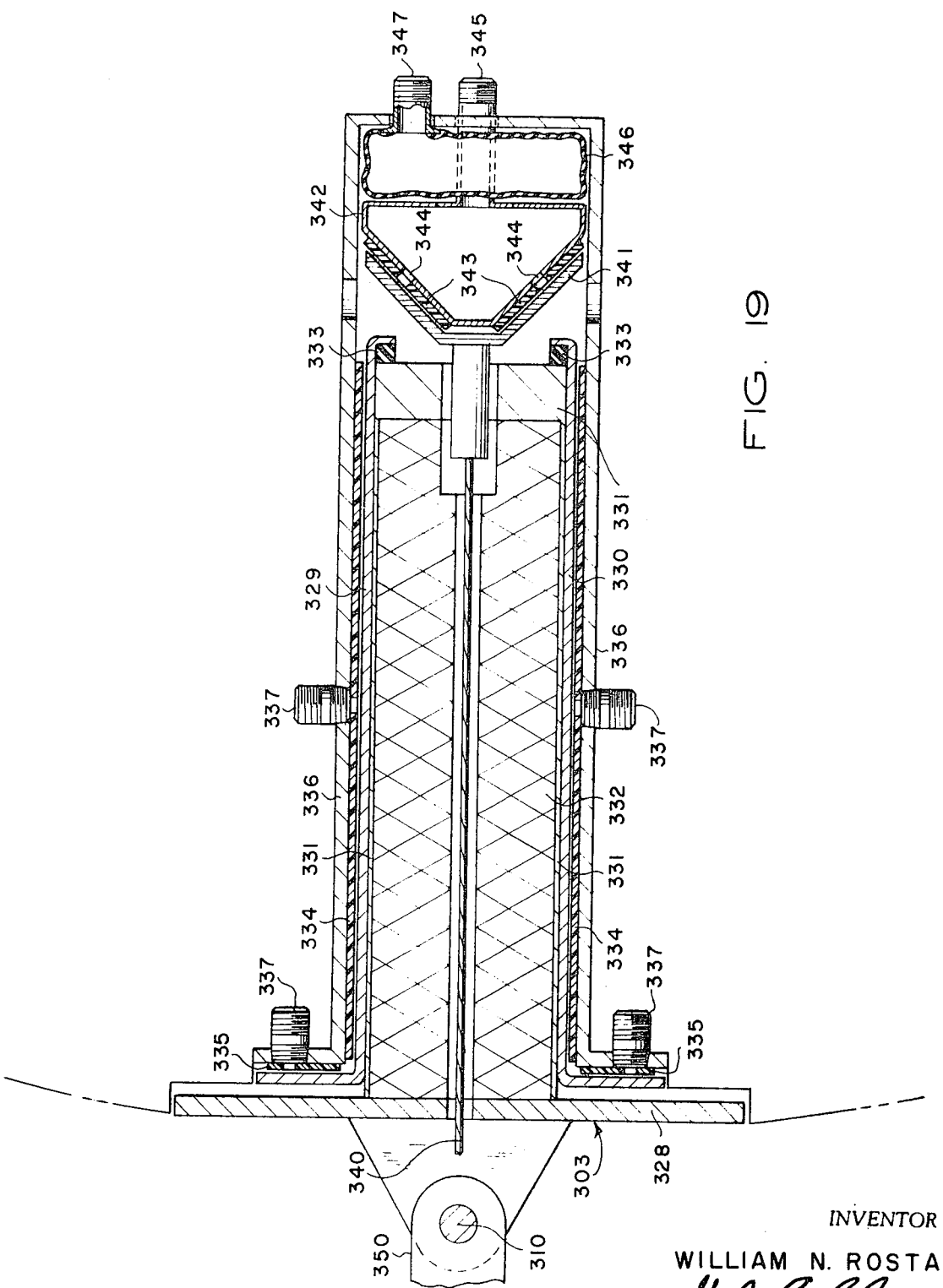
FIG. 19 is a sectional view of the inner track and bearing assembly for the aircraft of FIGS. 15 and 16.

With reference now to FIG. 19, the structure of the inner track 303 will be described in detail. FIG. 19 is an elevational view in section of the inner track along with its bearing and pitch control assemblies. It is noted that each rotor blade 302 is connected through the pivot 310 to a rotating ring or plate 328 which encircles the entire fuselage and has the five rotor blades attached thereto. The ring 328 rotates with the rotor blades. Secured to the inside edge of the ring 328 is a bearing structure included an upper bearing plate 329 and a lower bearing plate 330, these being fixed to the ring 328 by a structure including inner solid plates 331 along with honeycomb material 332 to conserve weight while retaining structural rigidity. Horizontal bearing pads 324 and vertical bearing pads 335, composed of plastic or the like, are supported by a stationary track 336, with feed lines 337 for bearing air leading into the spaces between the bearing plates and the bearing pads. The feed lines 337 are connected to the compressor of the main power plant, thus providing an air bearing system for the rotating part of the inner track.

A part of the pitch control arrangement for the rotor blades is also located in the inner track. A pitch control cable 340 extending from each rotor blade as will be described passes through the rotating ring 328 and inner core 332 to a pitch control ring 341 which of course rotates along with the rotating part of the inner track. The rotating control ring 341 may be caused to rotate about the same axis as that of the main ring 328, in which case there would be no cyclic pitch variation, or may be caused to rotate eccentrically with respect to the ring 328 in which case cyclic pitch will be introduced since the cables 340 going to the controls in the rotor blades will move in and out as the inner track rotates. The rotating cyclic control ring 341 bears upon a nonrotating cyclic pitch control ring 342 with plastic bearing pads 343 being provided along with bearing air inlets 344. Bearing air is introduced into the nonrotating ring 342 by an inlet 345 going to the compressor of the vehicle power plant so that an air-bearing system is provided for the rotating and nonrotating pitch control rings 341 and 342. To provide cyclic pitch control, the position of the nonrotating ring 342 can be varied by means of four air bladders 346 spaced around the periphery of the inner end of the inner track assembly. By varying the relative air pressures in the four bladders 346, by means of suitable control at the control panel, the eccentricity of the pitch control ring 342, and thus the cyclic pitch, may be varied. A conduit 347 is connected from each one of the bladders 346 to the air valves in the control mechanism for this purpose. If equal pressure is maintained in each bladder, there will be no cyclic pitch variation.

Turning now to FIG. 20, the outer end of the cable 340 is shown as it engages the pitch control mechanism located about midway along the length of one of the rotor blades 302. The pitch control mechanism is located within a hollow tube 350, about 1-inch diameter, which forms a fixed spar for the rotor blade or airfoil and which is connected to the pivot point 310 of FIG. 19. An aperture 349 in the top of the tubular space 350 defines cam surfaces 351A and 351 against which ride a cam 352 as best seen in FIGS. 20 and 21. This cam 352 is connected to a collective pitch control weight 353 and these two members are spring biased by a spring 354 forcing the members inwardly from a cyclic pitch control cylinder 355. The cylinder 355 also acts as a weight and tends to be forced outward due to centrifugal force as the rotor blade rotates. As the weight 353 moves within the cylinder 355, the cam 352 moves within the slot 359 in the cylinder wall. As seen in FIGS. 21 and 23, the outer extremity of the cam 352 is received within and moves within, a longitudinal groove defined by parallel ribs 360 which are fixed to a longitudinal beam 357A of the airfoil, described more fully in connection with FIG. 22. Operation of this mechanism may be understood by noting that, as the cam 352 moves to the right relative to the fixed spar 350, this movement occurring either under the influence of centrifugal force either with or without corresponding movement of the control cable 340, the cam surface 351B will urge the cam in a clockwise direction, as viewed in FIG. 23. This clockwise rotation of the cam 352 and weight 353 also effects clockwise rotation of the airfoil since the groove defined by the rib 360 must follow the rotation of the cam. Accordingly, as seen in FIGS. 22 and 23, the airfoil will be rotated to increase angle of attack or pitch and thereby tending to slow down the rotor blade. This tends to produce a constant speed or rotation for the rotor assembly. When the cam 352 moves to the left, as viewed in FIGS. 20 and 21, the airfoil is rotated in a direction to decrease the angle of attack or pitch. To introduce cyclic pitch, as the cable 340 is allowed to move outward slightly, the cylinder 355 moves outward, thus permitting the cam to move and increase blade pitch, whereas when the cable 340 moves inward at the other side of the vehicle in a given cycle, the cylinder 355 is pulled in and pitch is decreased.

A cross-sectional view of one of the foils or rotor blades 302 is seen in FIG. 22 wherein it may be noted that the aerodynamic shape is one of conventional type, for this embodiment the distance from leading edge to trailing edge of the blade being about 10 inches. Structurally, in addition to the cylindrical spar 350, the blade may contain spar caps 356 and beams 357. Except for the skins which may be stainless steel, and the leading and trailing tips, which are solid metal, the interior of the blade may be filled with honeycomb or other filler 358. Of course, the particular type of foil or blade is not critical here.

FIGS. 24 and 25 illustrate an alternative form of pitch control mechanism for changing the angle of attack of the rotor blade airfoil relative to the nonrotatably mounted tubular spar 350. As seen in FIG. 25, the spar 350 terminates intermediate the ends of the rotor blade where this pitch control mechanism is located; and the outer end of the spar includes an extension 363 defining a reduced diameter external cylindrical surface. A collective pitch control weight 364 is defined by an elongated member having a cylindrical bore which receives the cylindrical extension of the spar 364 with a clearance to permit relative axial movement. The outer surface of the weight 364, intermediate its ends, defines a square cross section; and this intermediate portion of the weight 364 slides within a square sleeve 365, of relatively short in length, which is rigidly fixed to the longitudinal beams 357 of the blade structure. It will be seen that the rotation of the weight 364 effects corresponding rotation of the airfoil about its longitudinal axis.

The weight 364 is retained against the action of centrifugal force by the pitch control cable 340 which is secured at its outer end to a retainer plate 366, an intervening spring 367. As in the embodiment of FIGS. 20 through 23, movement of the weight 364 relative to the spar extension 363 occurs under the influence of centrifugal force, either with accompanying movement of the control cable 340 to effect cyclic pitch control, or as permitted by the spring 367 to effect collective pitch control.

The rotation of the pitch control weight 364 accompanies the relative longitudinal movement, and is accomplished by complimentary spiral grooves 368 and 369 provided respectively in the spar extension 363 and the inner cylindrical surface of the weight 364, the grooves accommodating one or more balls which provide the rotating coupling between these members. As the weight moves outward or to the right as viewed in FIG. 25, it rotates counterclockwise as viewed in FIG. 24 relative to the spar extension 363 and effects an increase in angle of attack of the rotor blade airfoil 302. When the blade moves inward or to the left as viewed in FIG. 25, the airfoil angle of attack is decreased.

DESCRIPTION OF THE EMBODIMENT OF FIGURES 26 THROUGH 30

FIGS. 26 through 30 illustrate another form of rotor assembly and rotor drive and guiding structure for an aircraft as generally illustrated in FIGS. 15 and 16. In this embodiment, the outer ring of the rotor assembly, which includes the drive turbine blades, is permitted to separate vertically from the nonrotatable outer drive track, which includes the drive turbine nozzles. In this embodiment, the rotor assembly and the outer track are permitted to cone in the manner described above; however, in the event of loss of the supply air for the turbine drive, the nonrotating guide track will drop vertically away from the rotor assembly so as not to interfere with autorotation of the rotor assembly.

FIG. 26 is a diagrammatic view, generally similar to FIG. 17, of a portion of the aircraft taken generally in a radial plane passing through the axis of the rotor; showing a rotor blade 302 and a strut 305 in the same vertical plane. The rotor and stationary ring assemblies are shown in a lower position and in an upper position (phantom lines), the lower position shown being that of the assemblies when the aircraft is not under power.

To permit this coning, the rotor and stationary end assemblies have an appropriate hinged structure. As seen in FIG. 26, each of the struts 305 is pivotally mounted at 312 to swing in a vertical plane relative to the fuselage 301. Also as seen in FIG. 26, the pivot 312 is positioned some distance within the outer surface of the fuselage and supporting plate members 371 to be described, support the struts adjacent to the surface of the fuselage to define the above-mentioned lower position of the strut and stationary ring assembly. The stationary ring 315 includes four brackets or fittings 372 which are fixed to the ring by welding for example; and the outer ends of the struts 312 are pivotally connected to the brackets by means of pivots 311 which permit the swinging of the struts in a vertical plane relative to the stationary ring. With this arrangement then the stationary ring may move vertically or axially relative to the rotor axis. To further effect this movement, the struts must be permitted to elongate; and this is permitted by a telescoping connection adjacent the inner end of the struts between the principle strut member 305 and an inner telescoping member 373. If the strut 305 serves as the air conduit or duct for supplying air to the stationary ring 315, it will, of course, be hollow and suitable seal means must be provided at the outer pivot 311 between the strut and the ring fitting 372. THe fluid may be supplied to the inner end of the strut 305 by means of a suitable flexible conduit not shown.

Referring now to the rotor assembly as shown in FIG. 26, the rotor blade 302 is mounted to swing in a vertical plane about a pivot 310 defined by a lug affixed to the inner ring 303. The outer ends of the rotor blades are pivotally attached to the rotor outer ring 318 by structure best shown in FIG. 27 which is a vertical section through the outer tip of a rotor blade and the adjacent ring structures, the ring bracket 372 being omitted from the figure. The portion of the blade tip structure shown includes an end cap 375 provided with a tapped hole into which is threaded a headed bolt 376, the head end which extends outward to define an extension of the longitudinal axis of the rotor blade 302.

The rotor outer ring 318 is hollow and is circular in cross section, as viewed in FIG. 27, and the spherical bearing or pivot 311 is secured to the outer ring for the purpose of supporting the outer end of the rotor blade in the desired relation. More particularly, the bearing shoes of the spherical bearing 311 are fixed to the wall of the rotor outer ring 318 and the ball or inner portion of the spherical bearing is provided with a bore through which passes the shank of the bolt 376. Suitable clearance is provided between the bore and the bolt shank to permit relative sliding movement. A coil compression spring 317 is confined, within the outer ring 318, between the spherical bearing and the head of the bolt 376.

With this pivotal mounting at both ends of the rotor blade, the rotor outer ring 318 may also move vertically or axially relative to the rotor axis while the blades 302 swing in vertical planes. Again, elongation of the rotor blades must occur to permit this movement; and this elongation is effected by compression of the spring 377 and relative separation of the blade end cap 375 from the outer ring 318. With each of the five rotor blades secured to the outer ring 318 in this manner, the outer ring is maintained concentric with the rotor axis.

As best shown in FIGS. 27 and 29, the outer ring 318 of the rotor assembly is supported and guided by the stationary ring 315. The outer ring 318 is tubular in cross section, preferably being fabricated from aluminum tubing, and defining a manifold for supplying air to the turbine nozzles. The inward facing wall of this stationary ring is built up by means of inserts 380 which may be made of a plastic material and which are secured to the wall to define, in effect, a continuous annular rib. This rib 380 defines a cylindrical surface 381 facing toward the rotor axis, and provides an inwardly and downwardly extending lip 382 defining a beveled surface extending inwardly and downwardly relative to the cylindrical surface.

The rotor outer ring 318 is also provided with an annular rib structure preferably fabricated of plastic material and securely fixed to the wall of the outer ring 318, the rib structure extending essentially downward from the under surface of the rotor outer ring and defining turbine blades 383 connected at their lower ends by a continuous shroud 384. The shroud 384 defines a continuous annular wall which is beveled or inclined relative to a horizontal plane, the under surface of the shroud being dimensioned to lie adjacent to the upper beveled surface of the lip 384 whereby the rotor ring 318 is supported and guided by the lip.

Turbine nozzles 385 are defined by passages in the rib 380 communicating with suitable holes in the wall of the tubular stationary ring 315, and extending downwardly and inwardly opening to the cylindrical surface 381. These nozzles then direct the air against the turbine blades 383 to effect rotation of the rotor assembly relative to the stationary ring. Some of the compressed air passing from the nozzles 385 is directed between the beveled surfaces of the lip and shroud to define an air bearing maintaining vertical separation of the stationary ring and rotor assembly.

In the nonpower of rest condition of the outer track and rotor, the rotor shroud will actually rest on the lip of the stationary ring to support the rotor assembly, the entire assembly being supported in the lower position of FIG. 26 then by the support plates 371.

When the rotor is driven, the rotor assembly will tend to arise or cone, as above described; and the stationary ring 315 must rise with the rotor outer ring to maintain the driving relation of the turbine nozzles and blades. The rising or lifting of the stationary ring is effected by the downward vertical component of force from the turbine nozzles and this lifting force is more than sufficient to overcome the weight of the stationary ring and associated struts, which is necessary in order that the stationary ring 318 follow closely the rotor ring 315 to maintain the desired driving relationship.

In the event of a power failure resulting in loss of the supply of pressurized air to the stationary ring and the turbine nozzles, the lifting force for the stationary ring and struts is immediately lost and this assembly will drop to the rest position shown in FIG. 26. The rotor assembly will not drop immediately due to continued lift produced by angular momentum and autorotation and, accordingly, the stationary ring will separate vertically from the rotor ring as illustrated in FIG. 29. The rotational momentum and then autorotation assure the rotation of the rotor required for aerodynamic lift, and further assure the separation of the rotating rotor ring from the stationary ring. With this arrangement then, the stationary ring and associated structure do not interfere with the autorotation of the rotor assembly which effects lowering of the aircraft in a safe manner upon power failure.

FIG. 30 illustrates in detail a supporting arrangement for the inner ends of the struts 305. In the rest position, shown in full in FIG. 26, the struts are disposed at an angle slightly below the horizontal, while during the inflight condition shown in phantom lines the struts are disposed at an angle considerably above the horizontal. As shown in FIG. 30, the inner end of the outer telescoping portion of the strut 305 is provided with oppositely extending trunnion pins 388 which are received in complementary cam slots 389 provided in parallel, vertically disposed support plates 371 which are rigidly secured to the fuselage. The cam slots are generally elongated, angling upwardly and outwardly from an innermost apex 390 and having a lower recess 391 adjacent to the inner apex. In the rest condition of the struts 305, the struts are slightly extended, and the trunnion pins 388 are received in the recesses 391 to support these struts in the rest condition. As the struts swing upward to a horizontal position, the trunnion pins 388 move into the innermost positions in the apex 390 of the cam slots (as indicated in phantom); and as the struts move upward to an angle above the horizontal, they are again extended and this extension is permitted by movement of the trunnion pins upwardly and outwardly in the cam slots 389.

During the above-described autorotation condition, when the outer track 315 and struts 305 drop to the rest position independently of the rotor, the trunnion pins 388 must move to the apex 390 of the cam slots 389 as the struts pass through the horizontal plane, and then seek the rest condition in the recesses 391. This assures that the outer guide track 315 is concentric with the rotor axis and positioned to receive the rotor outer rotor ring 318 when the rotor settles to its rest condition within the outer track.

An important aspect of the invention is that the aircraft is designed to be powered by a pressure fluid operated turbine system wherein all the necessary power can be provided from a pressure fluid source at relatively low pressures. While other pressure fluids may be used, the preferred pressure fluid is compressed air; and a turbine drive system powered by low-pressure compressed air is an economical system for an aircraft of this type. Several forms of impulse turbine drives have been described and illustrated with particular reference to FIGS. 10, 18 and 27. With the arrangement of FIGS. 18 and 27, the driving air is supplied from a manifold directly to converging nozzles 316 and 385, respectively, which direct the air against the rotor blades of the rotor outer ring.

The drive system is a low-pressure, cold cycle system, using low-pressure air at the associated temperatures of compression. From calculations which have been made, it has been determined that a very practical inlet pressure to the converging nozzles of the turbine drive system is 13 p.s.i.g. (27.7 p.s.i.a.). An inlet pressure of this magnitude establishes a pressure ratio across the converging nozzles to produce sonic velocities at the nozzle discharge. Sonic nozzle discharge velocity is desirable in an impulse turbine drive system, and it is also desirable for maximum power output in a reaction turbine drive system. Higher pressures may be desirable under certain conditions to cover system losses or to increase the mass flow of air through the converging nozzles. However, use of higher pressure air at the nozzle inlets is at the expense of efficiency and economy; and it is believed that nozzle inlet pressures in excess of 22 p.s.i.g. would be economically prohibitive. For reduced power requirements, such as during descent of a passenger carrying aircraft, the nozzle inlet pressure may be as low as 5 p.s.i.g. For smaller versions of an aircraft of this type, such as a model or toy, nozzle inlet pressures as low as 0.5 p.s.i.g. would be sufficient to operate the aircraft. The inlet nozzle pressures referred to above are those that would be supplied in the outer track manifolds 315 of the above-described embodiments; and accordingly the output pressure delivered by the air supply compressor should be sufficiently above the inlet manifold pressures to allow for duct losses and other losses in the system.

The position of the parachute compartment 308 above the rotor blades is an important feature here, it being noted that in the conventional helicopter this arrangement is not possible. The position of the compartment permits deployment of the parachute while the airfoils are still rotating, and a unique emergency landing procedure may be used. The toroid-shaped air storage tank within the fuselage may store enough high-pressure air for perhaps 2 minutes of operation of the rotor blades. Thus, if the vehicle is at a high altitude the parachute may be first deployed, upon failure of the compressor or engine, and the pressurized air in the emergency storage tank retained. Then, as the vehicle nears the ground the parachute may be jettisoned and the reserve air in the storage tank used to land the vehicle in the desired area rather than depending upon the uncertainty of a parachute descent all the way to the ground.

Some of the other important features of the rotary wing aircraft of this invention may be noted here. THe fuselage shape which is almost spherical provides a maximum volume for a given outer surface area, as well as maximum structural strength for a given weight, and is of course compatible with the rotor system. This rotor system, rotating about the center of the fuselage, does not exert the downward force on the fuselage as exists in the conventional helicopter due to downwash from the rotor which is positioned above the fuselage. The inflow of air from the top along the spherical fuselage is excellent, and there is a slight increase in lift due to pressure reduction on the top of the fuselage. In a conventional helicopter, the inboard ends of the rotor blades have little lift, but introduced drag, due to their low-relative speed compared to the outer ends. In the present vehicle, however, this factor does not exist at nearly as great an extent due to the fact that the rotor blades do not extend into a hub. Also, compared to the conventional helicopter, the drag introduced by the rotor head and pitch linkage assembly is eliminated. The low position of the rotors produces a quicker entry into ground effect on descent.

Another feature of the invention which should be noted in detail is the rotor tip, full impulse, turbine which drive the outer ends of the rotor blades. This arrangement eliminates the initial expense, the maintenance expense, and the weight of the elaborate transmission needed in a conventional helicopter. Aside from the transmission itself, weight advantages occur due to the elimination of the fuselage structure required to support the transmission and oppose the engine/transmission torque in a conventional craft. The transmission oil system, including cooling, is another factor eliminated. The fixed part of the outer track including the turbine nozzle manifold gives some ducted fan effect, rather than that of the conventional rotor, which produces better inflow characteristics and eliminates some of the induced drag of the rotor tips. The rotor tip turbine requires minimum structural weight for a given torque power, and the full impulse turbine eliminates problems of stage sealing and gas distribution to the nozzles. The rotating outer ring, holding the turbine blades, provides excellent structural positioning of the rotor blade tips and eliminates much of the stresses in the rotor blades due to the Coriolis effect. The angle of the turbine nozzles for driving the rotor blades, being almost radial, while producing an efficiency of perhaps 50 percent instead of a possible 85 percent, for example, produces significant advantages over a lower angle. First, dissipation of power and antitorque purposes is not required, nor is the increased weight and complexity of a tail rotor or the like. Construction and maintenance costs are thereby lowered. The use of low pressure, low-temperature turbine air permits the use of low-cost injection molded tubine blades and the use of low-cost fiberglass air distribution ducting.

The pitch control arrangement in the center of the rotor blades illustrated in the second embodiment provides several advantages. The automatic centrifugally operated collective pitch control simplifies the control system for the aircraft and permits easier instrument flight and less demand on pilot attention and coordination, as well as reduced pilot fatigue and simplified pilot training. This arrangement also reduces parasitic drag and blade twist as well as reducing weight and blade stresses.

The size of the vehicle can vary over a relatively large range. Thus, the principles of the invention can be adapted to a toy. On the other hand, extremely large vehicles are feasible. It will be noted, however, that in the larger vehicles, the spherical body would not be desirable in most instances, although the body would be round in cross section along a plane to which the driving mechanism is attached. It will also be appreciated that fluids other than compressed air can be used for driving the airfoils. For example, one or more combustion chambers adapted for producing hot gases under pressure could be positioned either within the body of the aircraft or along the periphery of the track through which the airfoils are driven, much in the manner of a conventional gas turbine.

Although the invention has been described with respect to particular preferred embodiments thereof, many changes and modifications will become apparent to those skilled in the art in view of the foregoing description which is intended to be illustrative and not limiting of the invention.

What is claimed is:

1. An improved rotary wing aircraft comprising a body;
means defining a nonrotatable inner circular track encircling said body, said inner track means being disposed in a substantially horizontal plane relative to said body; means defining a circular outer track encircling said body; said outer track means being disposed in a plane substantially parallel to that of said inner track means and being concentric therewith; strut means for nonrotatably connecting said outer track means to said body;
a rotor comprising:
an inner ring rotatably supported by said inner track means; a plurality of elongated blades connected at one end to said inner ring and extending radially outward therefrom; and an outer ring concentric with said inner ring to which the outer ends of said blades are connected;
said outer track means and said outer ring defining turbine drive means responsive to the flow of low-pressure gas for effecting rotation of said rotor within said track means; supply chamber means associated with said outer track means for directing pressurized gas to said turbine means;
means for providing gas in said supply chamber means at a pressure in the range of from 0.5 to 22 p.s.i.g.

2. A rotary wing aircraft as set forth in claim 1 said struts being hingedly connected to said body and to said outer track means to permit axial movement of said outer track means relative to the axis of rotor rotation; and said rotor blades being hingedly connected to said inner and outer rings to permit corresponding axial movement of said outer ring.

3. A rotary wing aircraft as set forth in claim 2 wherein said outer track means and said rotor outer ring are of fixed diameters; and wherein said struts and said rotor blades are longitudinally extendable to permit said axial movement of said outer track means and said outer ring.

4. A rotary wing aircraft as set forth in claim 3 wherein said outer track means define a guide recess for said rotor outer ring; said guide recess opening vertically upward to permit axial separation of said guide track means and said rotor ring.

5. A rotary wing aircraft as set forth in claim 4 including means for guiding and supporting the inner ends of said strut means to maintain said outer track means concentric with said rotor axis during vertical movement of said outer track means.

6. A rotary wing aircraft as set forth in claim 5 wherein said strut means include inner and outer telescoping members; said inner telescoping members being pivotally connected to said body for vertical swinging movement; trunnion means provided at the inner ends of said outer telescoping members adapted for support by said body; and means on said body defining guide slots for confining the movement of said trunnion means during vertical swinging of said strut means.

7. A rotary wing aircraft as set forth in claim 6 wherein said guide slot means define innermost apexes for limiting the inward movement of said outer telescoping members thereby maintaining said outer track means concentric with said body.

8. A rotary wing aircraft as set forth in claim 3 wherein said rotor blades are connected to said outer ring by means accommodating relative radial movement between said ring and the outer ends of said blades and maintaining concentricity of said outer ring with said rotor axis.

9. A rotary wing aircraft as set forth in claim 4 wherein said guide track means includes nozzle means supplied by said supply chamber means providing a downward component of force sufficient to urge said outer track means upward in guiding relation with said rotor outer ring.

10. A rotary wing aircraft as set forth in claim 4 said rotor outer ring including a plurality of annularly spaced turbine blades; said outer track means including a plurality of spaced turbine nozzles opening to said supply chamber means and disposed to direct pressurized gas against said turbine blades; and said turbine nozzles being directed downwardly to provide a vertical component of force effective to urge said outer track means upwardly into driving relation with said rotor outer ring.

11. A rotary wing aircraft as set forth in claim 1
each of said rotor blades comprising a longitudinal spar element nonrotatably fixed to said inner ring, and an airfoil element rotatable relative to said spar element to effect pitch control;
a slide member movable longitudinally within said rotor blade relative to said spar element and said airfoil element; means nonrotatably coupling said slide member to one of said elements; and coacting cam means associated with said slide member and the other said elements effecting relative rotation of said elements responsive to longitudinal movement of said slide members;
an annular cyclic pitch control member in said inner ring; elongated means in said blades connecting each of said slide members to said annular pitch control member; and means controlling the eccentricity of rotation of said annular pitch control member with respect to the rotor axis to thereby cyclically control the pitch of the airfoil elements.

12. A rotary wing aircraft as set forth in claim 11
wherein said slide members are urged to move radially outward under the influence of centrifugal force; and wherein said elongated means connecting said slide members to said annular pitch control member are flexible cables.

13. A rotary wing aircraft as set forth in claim 12
wherein said slide members include first members connected to said flexible cables and second members urged radially inward relative to said first members by compression springs; and said cam means being associated with said second members.

14. An aircraft as set forth in claim 11
wherein said slide members are nonrotatably coupled to said airfoil element.

15. A rotary wing aircraft as set forth in claim 11
said slide members are nonrotatably coupled to said spar element.

16. A rotary wing aircraft as set forth in claim 11
wherein said slide members include weighted members urged radially inward by compression springs; and said cam means being associated with said weighted members, said weighted members tending to produce pitch control of said airfoil elements related to the speed of rotation of the rotor.

17. A rotary wing aircraft as set forth in claim 1
including means independent of said body defining said inner track means; and means for varying the angle of the plane of said inner track means and of said rotor relative to said body, to control the direction of movement of the aircraft.

18. A rotary wing aircraft as set forth in claim 17
including a plurality of pneumatic cylinders connecting said independent inner track means to said body; and means for controlling said pneumatic cylinders to vary the angle of the plane of said inner track means and rotor relative to said body to control the direction of movement of the aircraft.

19. A rotary wing aircraft as set forth in claim 1
including means for varying the angle of the plane of said rotor relative to said body; and said body having its center of gravity along said rotor and being of sufficient weight that the inclination of said rotor does not result in substantial inclination of said body.

20. A rotary wing aircraft as set forth in claim 1
wherein the pitch of said rotor blades is adjustable; and including means for producing cyclic pitch variations of said rotor blades.

21. A rotary wing aircraft as set forth in claim 20
including blade pitch control means provided in each of said rotor blades for pivoting said blades about their longitudinal axes;
a cyclic pitch control member in said inner rotor ring; and elongated means extending through said blades connecting said blade pitch control means with said pitch control member.

22. A rotary wing aircraft as set forth in claim 1
wherein said means for providing gas in said supply chamber means provides gas at a pressure of about 13 p.s.i.g.

23. A rotary wing aircraft as set forth in claim 1
wherein said means for providing gas in said supply chamber means provides gas at a pressure in the range from 5 to 22 p.s.i.g.

24. A rotary wing aircraft as set forth in claim 1
wherein said turbine drive means includes a plurality of annularly spaced converging nozzles; said supply chamber means supplying gas to the inlet ends of said nozzles at a pressure of about 13 p.s.i.g.; and said converging nozzles being adapted to discharge said gas at near sonic velocities.

25. A rotary wing aircraft as set forth in claim 1
said rotor outer wing having a plurality of annularly spaced turbine blades; said outer track means including a plurality of turbine nozzles for directing pressurized gas to said turbine blades; and said turbine nozzles being supplied from said supply chamber means.

26. A rotary wing aircraft as set forth in claim 25
wherein said turbine nozzles are converging nozzles having their inlet ends opening to said supply chamber means; said turbine nozzles being adapted to discharge pressurized gas at near sonic velocities from an inlet gas pressure in said supply chamber means of about 13 p.s.i.g.

27. A rotary wing aircraft as set forth in claim 1
including means for supporting said body when not in flight comprising:
an annular member encircling the lower portion of said body and extending below the lower surface thereof; and means for directing pressurized gas into the downward opening recess defined by said annular member and the lower portion of said body, whereby said aircraft is supported above a surface on a cushion of air and can be moved along said surface.

* * * * *